(12) United States Patent
Oka et al.

(10) Patent No.: US 6,244,049 B1
(45) Date of Patent: Jun. 12, 2001

(54) BRAKE SYSTEM

(75) Inventors: Hiroyuki Oka; Michio Kobayashi; Hidefumi Inoue; Yoshiyasu Takasaki; Isao Kobayashi; Masahiro Shimada, all of Saitama; Mamoru Sawada; Yuzo Imoto, both of Aichi, all of (JP)

(73) Assignees: Jidosha Kiki Co., Ltd., Tokyo; Denso Corp., Aichi, both of (JP)

( * ) Notice: Subject to any disclaimer, the term of this patent is extended or adjusted under 35 U.S.C. 154(b) by 0 days.

(21) Appl. No.: 09/225,484

(22) Filed: Jan. 6, 1999

(30) Foreign Application Priority Data

| Jan. 8, 1998 | (JP) | 10-013240 |
| Jan. 12, 1998 | (JP) | 10-016383 |
| Dec. 11, 1998 | (JP) | 10-352320 |
| Dec. 11, 1998 | (JP) | 10-352321 |

(51) Int. Cl.[7] .................................................. B60T 13/20

(52) U.S. Cl. ..................... 60/552; 91/369.1; 91/376 R; 303/114.3

(58) Field of Search .................... 303/114.1, 114.3; 60/552; 91/369.1, 376 R

(56) References Cited

U.S. PATENT DOCUMENTS

| 4,632,208 | * | 12/1986 | Takayama et al. | 303/3 |
| 4,813,357 | * | 3/1989 | Endo | 91/369.2 |
| 5,711,152 | * | 1/1998 | Gautier et al. | 60/547.1 |
| 5,802,952 | * | 9/1998 | Ikeda | 91/369.1 |
| 6,082,241 | * | 7/2000 | Kobayashi et al. | 91/367 |
| 6,089,140 | * | 7/2000 | Kobayashi et al. | 91/369.1 |

* cited by examiner

*Primary Examiner*—Robert J. Oberleitner
*Assistant Examiner*—Mariano Sy
(74) *Attorney, Agent, or Firm*—Sughrue, Mion, Zinn, Macpeak & Seas, PLLC

(57) ABSTRACT

A counter-force mechanism (37), which produces a counter force when a brake booster is operated, is made up of an input-side member (38) slidably disposed within a valve body (3), a second constant-pressure chamber (39) formed on the rear side of the input-side member and into which a pressure is introduced from a constant pressure chamber (A), and a second constant-pressure chamber (39) formed on the front side of the input-side member and into which a pressure is introduced from a variable pressure chamber (B). The counter force from the counter-force mechanism (37) is reduced by an orifice passage (43) as a counter-force reducing means in rapid operation of the brake.

12 Claims, 14 Drawing Sheets

BRAKE SYSTEM

BACKGROUND OF THE INVENTION

1. Field of the Invention

The present invention relates to a brake system with a brake booster, and more particularly to a counter force mechanism of a brake booster.

2. Discussion of the Prior Art

Generally, the brake system in use with a motor vehicle is made up of a brake booster with an input shaft interlocked with a brake pedal, a master cylinder interlocked with the output shaft of the brake booster, and a wheel cylinder operating by the hydraulic output of the master cylinder.

The brake booster comes in two varieties; a pneumatic pressure booster and a hydraulic pressure booster. The pneumatic pressure booster is composed of a valve body slidably disposed within a shell, a power piston provided in the valve body, a fixed pressure chamber and a variable pressure chamber disposed on both sides of the power piston, a valve mechanism for selectively connecting fluid passages located in the valve body, a valve plunger slidable disposed within the valve body and forming in part the valve mechanism, an input shaft for moving forward and backward the valve plunger to cause the valve mechanism to operate for passage switching, and an output shaft being moved forward when the power piston is moved froward.

The pneumatic pressure booster further includes a counter force mechanism. The counter force mechanism has a reaction disc, made of rubber, disposed between the output shaft and the valve plunger. When the booster is operated, the valve body and the valve plunger are simultaneously brought into contact with the reaction disc. A part of brake counter force applied to the output shaft is transmitted to the valve body, and the remaining one is transmitted to the valve plunger. The brake counter force acting on the valve plunger is transmitted to the driver via the input shaft and the brake pedal.

A servo ratio of the brake booster may be varied by varying a ratio of the counter force received by the valve body and that by the valve plunger, viz., a ratio of the pressure receiving areas of the valve body and the valve plunger.

The hydraulic pressure booster is composed of a power piston slidably disposed within a housing, a power chamber formed at one end of the power piston within the housing, a valve mechanism, provided in the power piston, for selecting connecting fluid passages in linking with the input shaft, a fluid supplying passage for communicating the power chamber with a hydraulic pressure source through the action of the valve mechanism, a discharge passage for communicating the power chamber with a reservoir through the action of the valve mechanism, and an output shaft being moved forward when the power piston is moved froward.

In the hydraulic pressure booster, a hydraulic pressure is transmitted from the power chamber to the output shaft, and then transmitted as a brake counter force to the driver.

In the conventional brake booster, the servo ratio is set at a high value so that a large brake hydraulic pressure is produced by a small pedaling force to the brake pedal. In a rapid operation for brake, the brake booster fails to follow the quick braking operation, and cannot produce a large output as expected. This fact implies that the rapid braking operation is difficult for the infirm driver, e.g., old man and woman.

In the case of the pneumatic pressure booster, upon depression of the brake pedal, the valve mechanism is switched through the action of the input shaft; a pressurized fluid is introduced into the variable pressure chamber; and the power piston and the valve body are moved forward. With the advancement of the valve body, the output shaft is advanced through the action of the reaction disc, the advancement of the output shaft generates a hydraulic pressure; a reaction or counter force to the hydraulic pressure is applied to the output shaft; and the brake counter force applied to the output shaft is distributed to the valve body and the valve plunger.

In the rapid operation for brake, before the power piston and the valve body are advanced by the pressurized fluid introduced into the variable pressure chamber, the valve plunger that is interlocked with the brake pedal through the input shaft is advanced. Most of the brake counter force applied to the output shaft is transmitted to the valve plunger. The result is that the brake counter force transmitted to the driver is considerably large.

The driver must depress the brake pedal overcoming such a large brake counter force. A pedaling force required for the rapid braking is much larger than that in a normal braking operation in which the brake pedal is gradually depressed to produce a large braking force.

This is true for the hydraulic pressure booster.

SUMMARY OF THE INVENTION

Accordingly, an object of the present invention is to provide a brake system which is capable of produce a large brake output by a small pedaling force when the brake booster is rapidly operated.

A brake system constructed according to the present invention includes 1) a hydraulic-pressure counter-force mechanism for transmitting a counter force to the input shaft when the brake booster is operated, and 2) counter-force reducing means for reducing the counter force transmitted to the input shaft when the brake booster is rapidly operated.

In the brake system thus constructed, in a normal operation for brake, the counter force is transmitted from the hydraulic-pressure counter-force mechanism to the input shaft. Therefore, the brake system can be operated in a normal manner. In a rapid operation for brake, the counter-force reducing means reduced the counter force transmitted to the input shaft. Therefore, the brake booster can be operated by a smaller pedaling force in the rapid operation than in the normal operation.

Also, a brake booster according to the invention is structured so that a counter force, which is applied to the input shaft when the brake booster is operated, is not transmitted to the valve plunger, and includes a counter-force piston slidably disposed on the valve body, a buffering member disposed between the counter-force piston and the valve plunger, and pseudo counter force applying means for transmitting an urging force produced by a difference in pressure between the variable-pressure chamber and the constant-pressure chamber, which is exerted on the counter-force piston, to the valve plunger through the buffering member as a pseudo counter force.

With such a construction, when the brake booster is operated, the counter force applied to the output shaft is not applied to the valve plunger. Even when, in a rapid operation for brake, the valve plunger interlocked through the input shaft is greatly advanced before the power piston and the valve body are moved forward by the pressurized fluid introduced into the variable pressure chamber, the counter force applied to the output shaft is not transmitted to the driver via the valve plunger and the input shaft.

The pseudo counter force applying means includes a counter force piston for receiving a differential pressure between the second constant-pressure chamber into which a pressure is introduced from the constant pressure chamber and the second variable-pressure chamber into which a pressure is introduced from the variable pressure chamber. In a normal operation for brake, a pseudo counter force, which depends on a differential pressure between the variable pressure chamber and the constant pressure chamber, is applied to the valve plunger. At the instant that a rapid operation is performed for brake, a pressure in the variable pressure chamber does not increase because of a slow response of the brake booster. Therefore, a pressure in the second variable-pressure chamber also does not increase. As a consequence, a large differential pressure is not applied to the counter force piston. This implies that a large brake output is produced by a small braking force.

The counter force piston is brought into contact with the valve plunger in a state that the buffering member is inserted therebetween. There is no chance of encountering such an unwanted situation that at the instant that the counter force piston hits the valve plunger, the driver feels as if the input shaft is instantaneously forced back. Therefore, a good operation feeling is secured.

DETAILED DESCRIPTION OF THE PREFERRED EMBODIMENTS

The preferred embodiments of the present invention will be described with reference to the accompanying drawings.

In the description of the specification, the invention is incorporated into a pneumatic pressure booster in first to third embodiments and into a hydraulic pressure booster in fourth to sixth embodiments.

<First Embodiment>

A pneumatic pressure booster which is a first embodiment will be described with reference to FIGS. 1 through 4.

Figure 1:
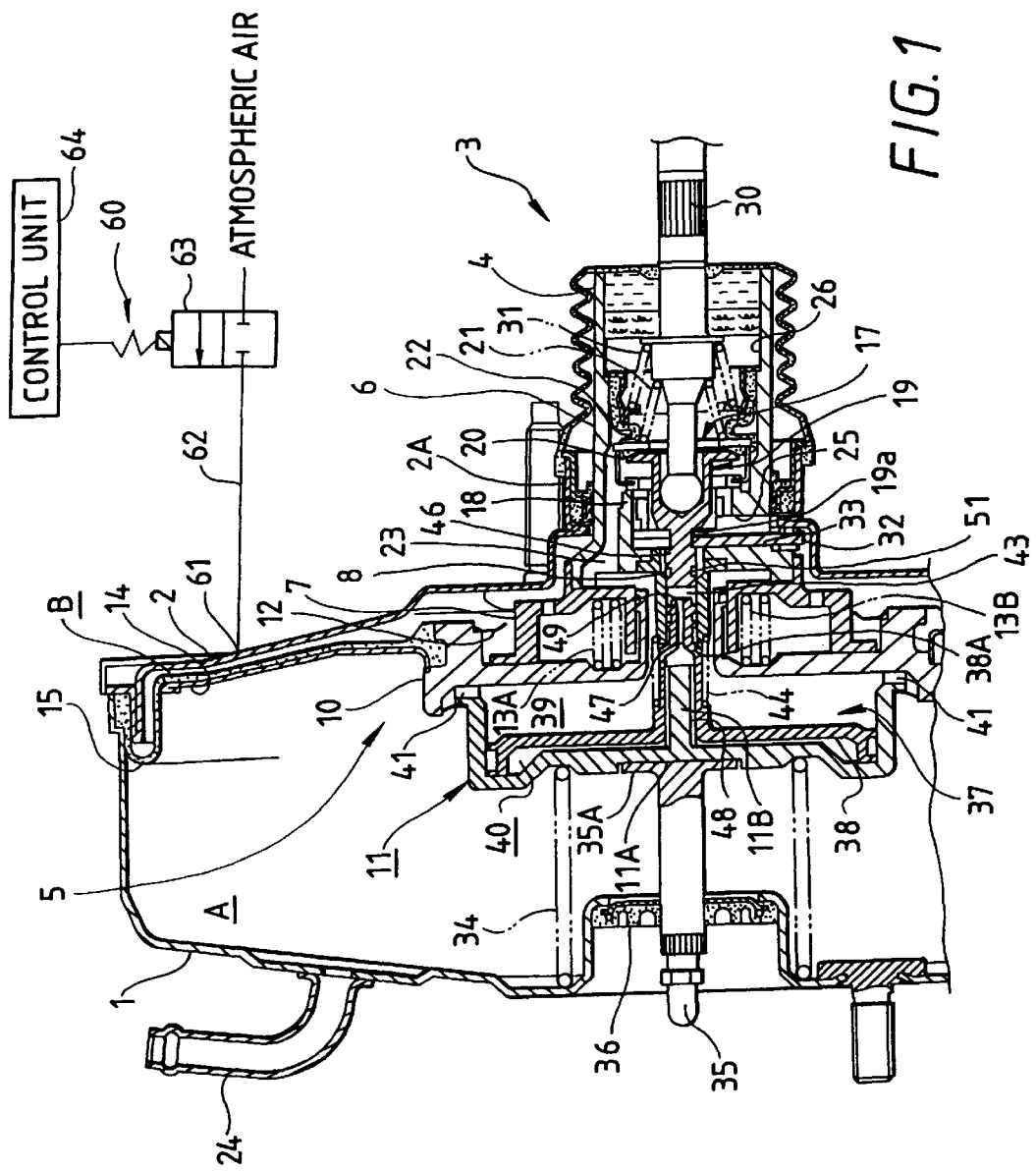
FIG. 1 is a cross sectional view showing a brake booster which is a first embodiment of the present invention.

As shown in FIG. 1, the pneumatic pressure booster (referred to simply as a brake booster) is made up of a front shell 1, a rear shell 2 and a valve body 3. The valve body 3 is slidable provided within the front shell 1 and the rear shell 2. The valve body 3 includes an input-side member 4 and an output-side member 5. The input-side member 4 is hermetically held within a cylindrical portion 2A of the rear shell 2 in a slidable fashion. The output-side member 5 is fit into the front-side end of the input-side member 4 in a state that the former is movable relative to the latter.

The input-side member 4 includes a cylindrical member 6, an outer member 7 and an inner member 8. The cylindrical member 6 is slidable inserted into the cylindrical portion 2A of the rear shell 2. The outer member 7, shaped like U in cross section, is fit and fastened to the outer peripheral surface of the front-side end of the cylindrical member 6, and is opened at the front-side end thereof. The inner member 8, cylindrical, is fit and fastened to the inner peripheral surface of the front-side end of the cylindrical member 6.

The output-side member 5 includes a rear side member 10 located on the rear side thereof, and a front side member 11 located on the front side. The rear side member 10, shaped like U in cross section, is opened at the rear-side end thereof. The front side member 11, coupled with the front side of the rear side member 10, is opened at its front-side end to form a cylindrical member with the bottom.

The rear side member 10 of the output-side member 5 is slidable coupled, at its front-side opening, to the outer member 7 of the input-side member 4 whereby the output-side member 5 is movable between the outer member 7 and a retainer 12 attached to the rear side member 10. Springs 13A and 13B are resiliently inserted between the rear side member 10 and a valve mechanism 17 as a resilient member. Those springs axially urge the output-side member 5 and the input-side member 4 in such directions that these members are separated from each other.

A power piston 14 is provided on the outer periphery of the output-side member 5, and a diaphragm 15 is further provided while being disposed on the rear side of the power piston 14. The diaphragm 15 demarcates the inner space of the sealed container into a constant pressure chamber A located on the front side and a variable pressure chamber B located on the rear side.

Description will be given about the valve mechanism 17 for switching a fluid circuit between the constant pressure chamber A and the variable pressure chamber B. The valve mechanism 17 includes a ring-like, first valve seat 18, a ring-like second valve seat 20 and a valve element 22. The first valve seat 18 is formed around the cylindrical member 6 of the input-side member 4. The second valve seat 20 is provided on the right side of a valve plunger 19 that is slidable fit into the cylindrical member 6. The valve element 22 seats on the first valve seat 18 and the second valve seat 20 with the aid of a puppet return spring 21.

A space above the outer periphery of the first valve seat 18 communicates with the constant pressure chamber A by way of a constant-pressure passage 23 that is located within the body of the cylindrical member 6 and between the outer member 7 and the inner member 8. The constant pressure chamber A communicates with an intake manifold of an engine (not shown) by way of a negative-pressure guide tube 24 coupled into the front shell 1. A mid portion between the first valve seat 18 and the second valve seat 20 communicates with the variable pressure chamber B by way of a variable-pressure passage 25 extending in the radial direction within the cylindrical member 6. A space on the inner peripheral of the second valve seat 20 communicates with atmospheric air by way of a pressure passage 26 formed within the input-side member 4.

One end of the input shaft 30 is pivotally coupled into the right end of the valve plunger 19, which is slidable provided within the input-side member 4 of the valve body 3. A spring 31 is provided between the input shaft 30 and the input-side member 4 of the valve body 3. A spring force of the spring 31 is larger than that of the puppet return spring 21. In an illustrated state of the pneumatic pressure or brake booster where a brake pedal (not shown) is not depressed, the spring 31 puts the valve element 22 on the second valve seat 20 of the valve plunger 19 while it detaches the valve element 22 from the first valve seat 18 of the input-side member 4. The other end of the input shaft 30 is coupled to the brake pedal.

A key member 32 is provided to prevent the valve plunger 19 from slipping off the cylindrical member 6 of the input-side member 4. The key member 32 has a bifurcated portion (not shown) ranging from the center to the top of the key member. The key member 32 is inserted into an insertion hole 33 radially formed in the cylindrical member 6. The base of the bifurcated portion of the key member 32 is brought into engagement with a small-diameter portion 19a of the valve plunger 19.

The insertion hole 33 and the variable-pressure passage 25 are arranged side by side in the axial direction of the input-side member 4. The width of the insertion hole 33 (its widthwise direction being perpendicular to the axial direction of the input-side member 4 and to the direction in which the key member 32 is inserted into the insertion hole 33) is wider than the width of the variable-pressure passage 25 when it is viewed in the same direction. By such a width selection, the key member 32 may be displaced in the axial direction of the input-side member 4 only within the insertion hole 33.

The key member 32 and the valve plunger 19 are arranged such that the valve plunger 19 is axially displaceable relative to the key member 32 within the range of the axial length of the small-diameter portion 19a. Therefore, when the brake booster is not operated, or in a non-operation state, the input-side member 4 and the valve plunger 19 come in contact with the key member 32 that is in contact with the inner surface of the rear shell 2. In this state, the valve plunger 19 is held at a position where it advances relative to the valve body 3. With this, a lost stroke of the input shaft 30 is reduced at the start of the brake booster.

In a non-operation state of the brake booster, a return spring 34, which is resiliently placed between the inner wall of the front shell 1 and the front side member 11 of the output-side member 5, brings the rear side member 10 of the output-side member 5 into contact with the outer member 7 of the input-side member 4, while resisting the spring forces of the springs 13A and 13B, and the brake booster is held at the illustrated non-operation position.

In the present embodiment, the front end of the output shaft 35 is projected outside from the shaft portion of the front shell 1 through a sealing member 36 provided in the shaft portion, and is coupled to a piston of a master cylinder (not shown). The base 35A of the output shaft 35 is fit into a recess 11A formed in the front side member 11 of the output-side member 5, whereby it is integrally coupled led with the output-side member 5.

In the brake booster of the embodiment, a counter brake force, which acts on the output shaft 35 through the master cylinder when the brake booster is operated, is perfectly received by the output-side member 5 of the valve body 3, whereby it is not transmitted to the valve plunger 19.

Meanwhile, in such a design that the counter brake force is not transmitted to the valve plunger 19, the driver cannot have a feeling of braking operation.

To avoid this disadvantage, the embodiment uses a pneumatic-pressure counter-force mechanism 37 which generates a pseudo counter force in accordance with an amount of depression or stroke of the brake pedal that is performed by the driver, and applies it to the driver.

To be more specific, the pneumatic-pressure counter-force mechanism 37 is made up of a counter force piston 38, a second constant-pressure chamber 39 and a second variable-pressure chamber 40. The counter force piston 38 is slidable fit to a support 11B protruded to the rear side from the front side member 11 of the output-side member 5. The second constant-pressure chamber 39 is formed within the front side member 11 while being located closer to the rear side than the counter force piston 38. The second variable-pressure chamber 40 is formed within the front side member 11 while being located closer to the front side than the counter force piston 38.

The second constant-pressure chamber 39 communicates with the constant pressure chamber A through a communicating hole 41 formed in the end of the front side member 11 which is located on the rear side, and further communicates with the constant-pressure passage 23.

The second variable-pressure chamber 40 communicates with the variable-pressure passage 25 through an orifice passage 43 constituting a counter-force reducing means (to be described later), and further the variable pressure chamber B through the variable-pressure passage 25. The second variable-pressure chamber 40 also communicates with the constant pressure chamber A through the constant-pressure passage 23.

Figure 2:
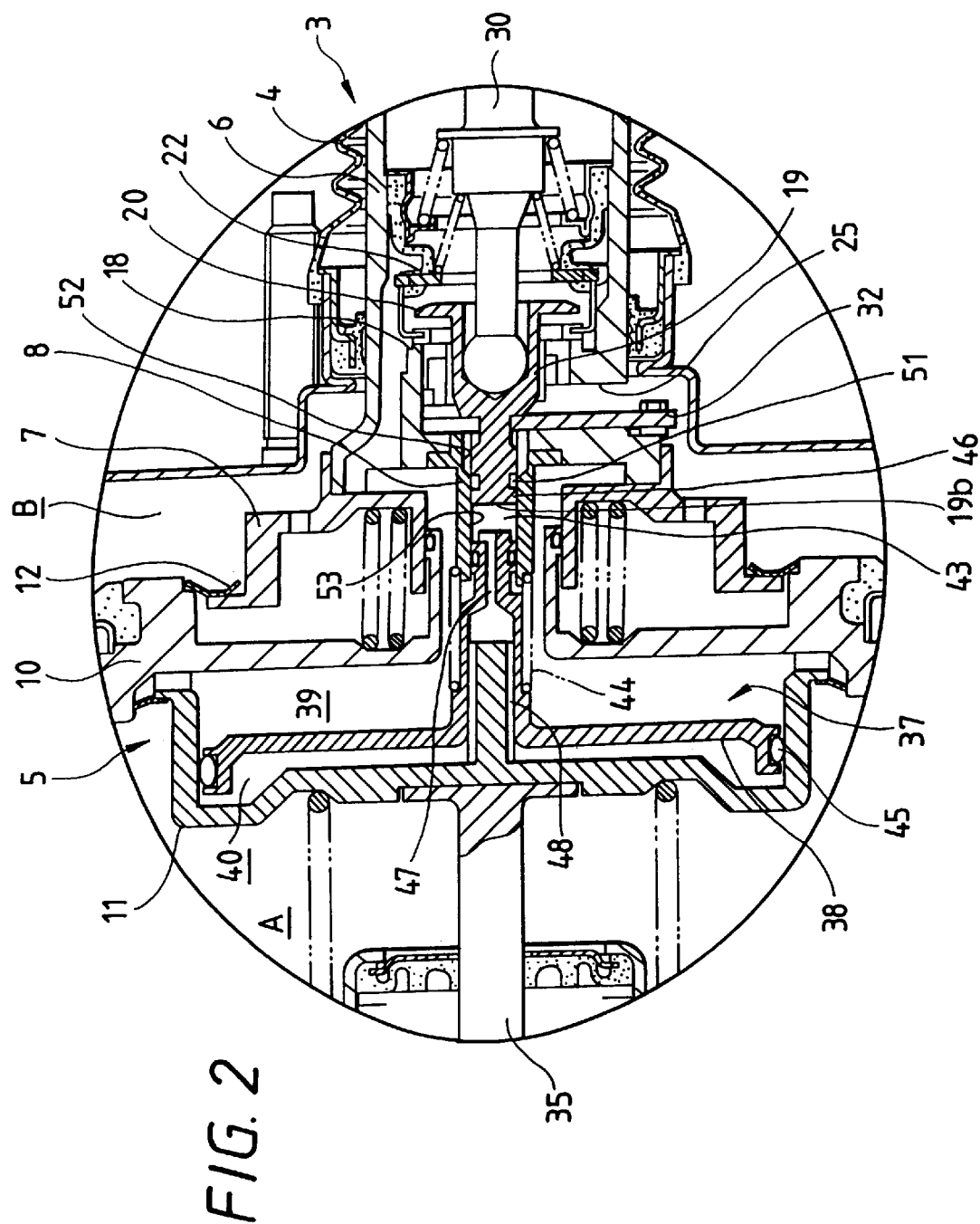
FIG. 2 is an enlarged, sectional view showing a key portion of the FIG. 1 booster when it is rapidly operated.

A protruded portion 38A, which is protruded from the shaft portion of the counter force piston 38, is slidable and air tightly fit into the inner member 8 of the input-side member 4, and is confronted with a large-diameter portion 19b of the valve plunger 19 within the inner member 8 (FIG. 2).

A spring 44 is resiliently put between the counter force piston 38 and the inner member 8 of the input-side member 4. When the brake booster is in the non-operation state, the spring 44 urges the counter force piston 38 to come in contact with the front side member 11 of the output-side member 5, whereby the counter force piston 38 is placed at an advance end position. In this state, a gap is present between the protruded portion 38A of the counter force piston 38 and the valve plunger 19.

A ring-shaped sealing member 45 is disposed on an outer periphery of the counter force piston 38 to seal a gap between the counter force piston 38 and the front side member 11.

Description will be given about the orifice passage 43 which functions to reduce a counter force which is transmitted from the pneumatic-pressure counter-force mechanism 37 when the brake pedal is depressed at relatively high speed.

The orifice passage 43 includes a first passage 46, a second passage 47, and third passages 48. The first passage 46 is formed between the inner peripheral surface of the inner member 8 of the input-side member 4 and the outer peripheral surface of the large-diameter portion 19b of the valve plunger 19, and communicates with the variable-pressure passage 25. The second passage 47 is formed in the protruded portion 38A of the counter force piston 38 and communicates with the first passage 46. The third passages 48 are formed around the outer peripheral surface of the support 11B of the front side member 11 of the output-side member 5, and communicates with the second passage 47 and the second variable-pressure chamber 40. A fluid passage area of the orifice passage 43, viz., a passage area of the second passage 47 formed in the protruded portion 38A of the counter force piston 38, is selected to be smaller than that of the variable-pressure passage 25.

The second passage 47 is opened into a groove 49, which is radially formed in the end face of the protruded portion 38A of the counter force piston 38. Therefore, even when the protruded portion 38A comes into contact with the large-diameter portion 19b of the valve plunger 19, the first passage 46 may communicate with the second passage 47 through the groove 49.

In the embodiment under discussion, to prevent a counter force that is originated from the pneumatic-pressure counter-force mechanism 37 from being transmitted to the valve plunger 19 when the brake pedal is rapidly depressed, the embodiment uses a ring-like sealing member 51 which radially and outwardly protrudes from the large-diameter portion 19b of the valve plunger 19 that is inserted into the orifice passage 43.

When the brake booster is in the non-operation state or normally operated, the sealing member 51 is positioned within a region defined by a stepped face 52 (FIG. 2) formed on the inner peripheral surface of the inner member 8, which forms a part of the orifice passage 43. In this state, the variable-pressure passage 25 communicates with the second variable-pressure chamber 40 through a space between the sealing member 51 and a recess of the stepped face 52.

When the valve plunger 19 is located at the advance end position to the input-side member 4, the sealing member 51 leaves the region of the stepped face 52, and positioned on the smooth face 53 located closer to the front side. In this state, the sealing member 51 is in close contact with the smooth face 53 to completely close the orifice passage 43.

Thus, when the brake pedal is rapidly depressed, the valve plunger 19 is located at the advance end position to the input-side member 4, the sealing member 51 is in close contact with the smooth face 53 of the inner member 8 to interrupt the communication of the variable-pressure passage 25 with the second variable-pressure chamber 40.

Figure 3:
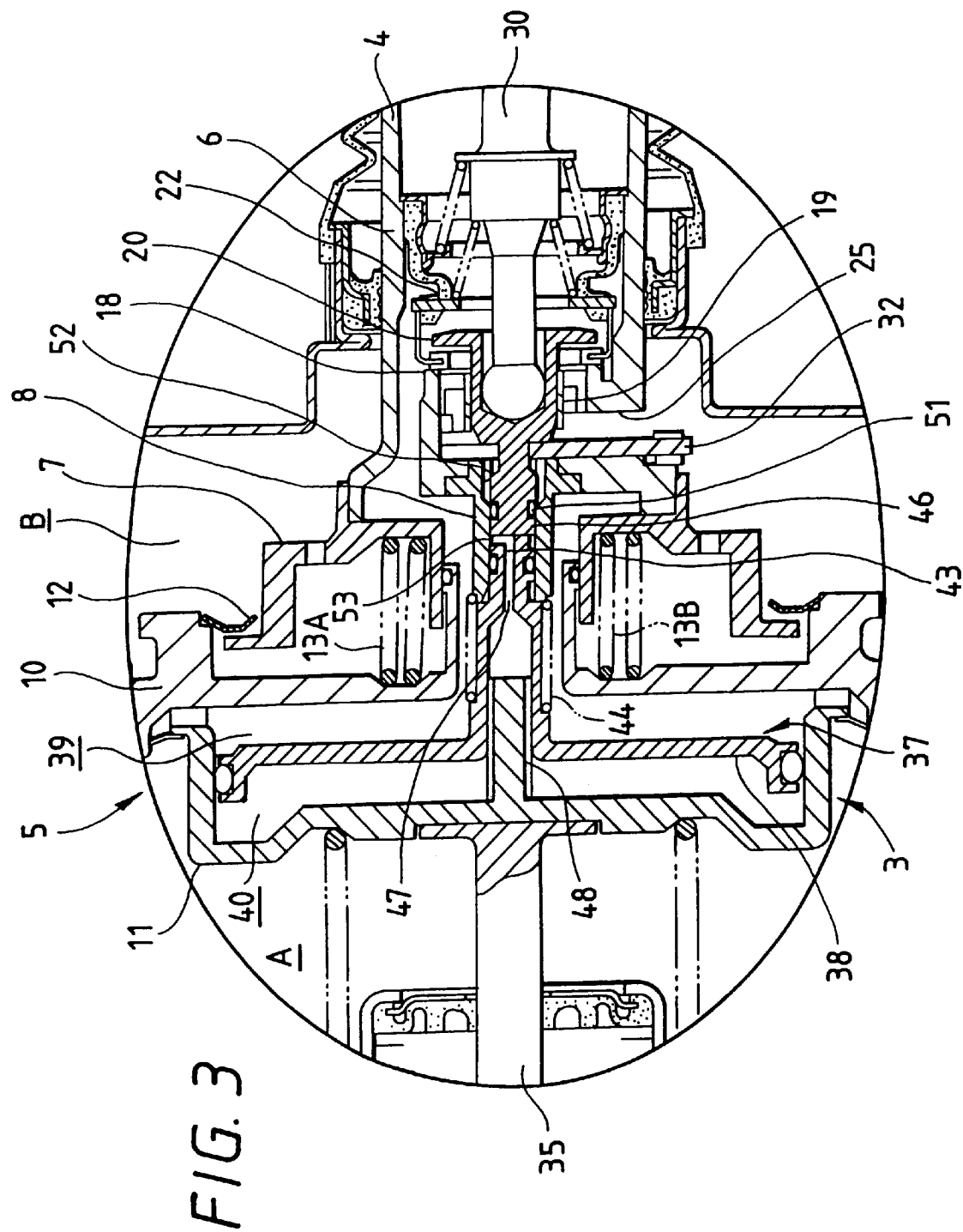
FIG. 3 is an enlarged, sectional view showing a key portion of the FIG. 1 booster when it is in the full load condition.

Also when the brake booster is in a full load condition, the valve plunger 19 is located at the advance end position to the input-side member 4, the sealing member 51 is in close contact with the smooth face 53 to interrupt the orifice passage 43 (FIG. 3).

In the embodiment, the inner member 8 is shaped to have the stepped face 52 and the smooth face 53. If necessary, the following alternative may be adopted: the portion of the inner member 8 corresponding in location to the stepped face 52 is shaped to be larger in diameter than the sealing member 51, the portion thereof corresponding to the smooth face 53 is shaped to be smaller in diameter than the sealing member 51.

The brake booster of the embodiment adopts stroke reduction means 60 for reducing an amount of depression or stroke of the brake pedal when it is rapidly depressed, when comparing with that in a normal pedal depression.

The stroke reduction means 60 is made up of a conduit 62, a valve 63 for opening and closing the conduit 62, and a control unit 64. The conduit 62 is coupled to an opening 61 formed in the rear shell 2 and sets up a communication of the variable pressure chamber B with atmospheric air. The control unit 64 closes the valve 63 when the brake booster is in the non-operation state or normally operated, thereby blocking the entering of atmospheric air into the variable pressure chamber B. When the brake pedal is rapidly operated, the control unit 64 releases or opens the valve 63 to allow atmospheric air to flow into the variable pressure chamber B.

The control unit 64 receives a signal from a sensor (not shown) for sensing a depression force acting on the brake pedal or a stroke speed; compares a value of the sensor signal with a predetermined value; and when the former is in excess of the latter, the control unit 64 judges that the brake pedal has been rapidly depressed, and releases the valve 63.

In the brake booster of the embodiment, the predetermined value used in the control unit 64 is selected so as to open the valve 63 when the brake pedal is depressed quickly and the valve plunger 19 rushes to the advance end position to the valve body 3.

An operation of the thus constructed brake booster will be described.

1) The pneumatic pressure booster or brake booster is in the above-mentioned non-operation state, and in this state the bake pedal is relatively gently depressed. Then, as shown in FIG. 3, the valve element 22 sits on the first valve seat 18 of the input-side member 4 to interrupt the communication of the constant-pressure passage 23 with the variable-pressure passage 25. At the same time, the valve element 22 disengages from the second valve seat 20 of the valve plunger 19 to set up a communication of the variable-pressure passage 25 with the pressure passage 26. In this state, atmospheric air is introduced into the variable pressure chamber B by way of the variable-pressure passage 25; a differential pressure is created between the constant pressure chamber A and the variable pressure chamber B; and with the differential pressure, the output-side member 5 of the valve body 3 and the power piston 14 are advanced in unison.

The amount of advancement of the input-side member 4 is smaller than the advancement of the output-side member 5 and the power piston 14.

A portion of the input-side member 4 which is located within the variable pressure chamber B is subjected to a negative pressure, while a portion of the input-side member 4 protruded from the variable pressure chamber B is subjected to atmospheric air. As a result, since a differential pressure larger than a set load of the springs 13A and 13B is exerted on the input side member 4 immediately after the valve mechanism 17 switches the fluid circuit, the input side member 4 is abutted against the output side member 5, so that they are advanced in unison. Then, the differential pressure becomes reduced with a reduced negative pressure within the variable pressure chamber B, and when the above-mentioned differential pressure becomes lower than the set load of the springs 13A and 13B, the input side member 4 becomes gradually insulated from the output side member 5.

As described above, in the embodiment, the amount of advancement of the input-side member 4 containing the valve mechanism 17 is smaller than that of the output-side member 5. Because of this, the advancement of the input shaft 30, which is performed with the advancement of the input-side member 4, and the stroke of the brake pedal interlocked with the input shaft 30, may be relatively reduced. Therefore, the brake feeling is enhanced when comparing with a case where the output-side member 5 and the input-side member 4 are fixed, and the amount of advancement of the output-side member 5 is equal to that of the input-side member 4.

Atmospheric air is introduced, through the orifice passage 43, into the second variable-pressure chamber 40 that is located on the front side of the counter force piston 38. Therefore, a differential pressure is created between the second variable-pressure chamber 40 and the second constant-pressure chamber 39, and urges the counter force piston 38 to move to the rear side.

In turn, the counter force piston 38 compresses the spring 44 and retracts; its protruded portion 38A comes in contact with the end face of the large-diameter portion 19b of the valve plunger 19, with the result that the differential pressure acting on the counter force piston 38 is transmitted to the brake pedal through the valve plunger 19 and the input shaft 30. Therefore, the driver feels his brake operation.

By the way, when the brake pedal is continuously and gently pedaled to make the brake booster in a full-load state, the input side member 4 is stopped at a position where the input side member 4 and the springs 13A, 13B are balanced with each other so that it stops in front of the retainer 12.

The timing and speed of the moving of the input-side member 4 apart from the output-side member 5 may be adjusted by use of a set load and a spring constant of the springs 13A and 13B.

2) The operation of the brake booster when the depression speed of the brake pedal is more quick than in the above-mentioned case where the brake pedal is gently depressed, will be described. In this case, the valve plunger 19, which operates in linking with the brake pedal through the input shaft 30 is more greatly advanced to the input-side member 4 than when the brake pedal is normally depressed.

Therefore, the valve element 22 more greatly moves from the second valve seat 20 of the valve plunger 19 than in the gentle operation for brake. The result is that a great amount of atmospheric air is introduced into the variable pressure chamber B through the variable-pressure passage 25, and hence the output-side member 5 of the valve body 3 and the power piston 14 are moved forward at relatively high speed.

Only the same amount of atmospheric air as in the gentle operation for brake is led into the second variable-pressure chamber 40 that is located on the front side of the counter force piston 38, by way of the orifice passage 43. Therefore, the counter force increases after the output increases.

As a result, since the counter force that is given to the brake pedal by the pneumatic-pressure counter-force mechanism 37 when the depressing speed of the brake pedal is high becomes relatively smaller than that when the depressing speed is low, the brake booster can be operated by a smaller force.

3) The operation of the brake booster when the brake pedal is rapidly depressed will be described. In this rapid operation, as shown in FIG. 2, the valve plunger 19 that operates in linking with the brake pedal through the input shaft 30 rushes to the advance end position to the valve body 3.

As a result, the valve element 22 greatly moves apart from the second valve seat 20 of the valve plunger 19, and a great amount of atmospheric air is introduced into the variable pressure chamber B through the variable-pressure passage 25. At the same time, the control unit 64 of the stroke reduction means 60 judges that the braking operation is rapidly performed, opens the valve 63 thus far closed to allow atmospheric air to separately flow into the variable pressure chamber B through the conduit 62.

This causes the differential pressure exerted on the output side member 5 and the power piston 14 to rise rapidly, with the result that the output side member 5 and the power piston 14 are advanced rapidly to conduct the rapid braking operation.

Since the differential pressure exerted on the input side member 4 is reduced rapidly by the atmosphere introduced from the conduit 62 in addition to the atmosphere introduced from the valve mechanism 17, the input side member 4 is isolated from the output side member 5 at a time earlier than a time of the normal operation.

As a result, the amount of depressing the brake pedal by the driver is reduced as much as a position at which the input side member 4 is isolated from the output side member 5 becomes shorter than that in the normal braking operation. Therefore, the depressing amount at the time of the rapid braking operation can be reduced more than that at the time of the normal braking operation. As a result, the response of the hydraulic pressure booster is improved to enable the reduction in braking distance at the time of rapid braking operation.

The atmospheric air is conventionally introduced into the second variable pressure chamber 40 of the counter-force piston 38 at a front side thereof through the orifice passage 43, more particularly, a space between the sealing member 51 and the stepped face 52. However, in this embodiment, in such rapid braking operation, the sealing member 51 passes the stepped face 52 and comes in close contact with the smooth face 53 to close the orifice passage 43 immediately, thereby allowing a slight atmospheric air to be introduced into the second variable pressure chamber 40. As a result, the counter force piston 38 is urged against the rear side due to a small differential pressure so as to be abutted against the valve plunger 19.

As a result, the counter force given to the brake pedal by the pneumatic-pressure counter-force mechanism 37 becomes very small in the rapid braking operation where the valve plunger 19 rushes to the advance end position to the valve body 3. Therefore, in such rapid braking operation, the brake booster can be rapidly operated by a still smaller pedaling force than that in the normal braking operation.

The embodiment is arranged such that the valve body 3 is constructed with the input-side member 4 and the output-side member 5, and the amount of advancement of the output-side member 5 is smaller than of the input-side member 4. In case where the brake booster is put in a full load condition and in this state the driver depresses the brake pedal to produce a further larger braking force, a dead zone where the brake output and the counter force are not increased even if the brake pedal is depressed will appear till the input-side member 4 abuts on the relatively advancing output-side member 5.

However, in this embodiment, when the brake booster is in a full load condition, as described above, since the sealing member 51 provided on the valve plunger 19 comes in close contact with the smooth face 53 of the inner member 8 to close the orifice passage 43. This enables the output-side member 5 to be advanced in linking with the input-side member 4 by the atmospheric air in the space air-tightly closed by the orifice passage 43, the second variable-pressure chamber 40 and the sealing member 51. Therefore, no dead zone is created.

<Second Embodiment>

Figure 4:
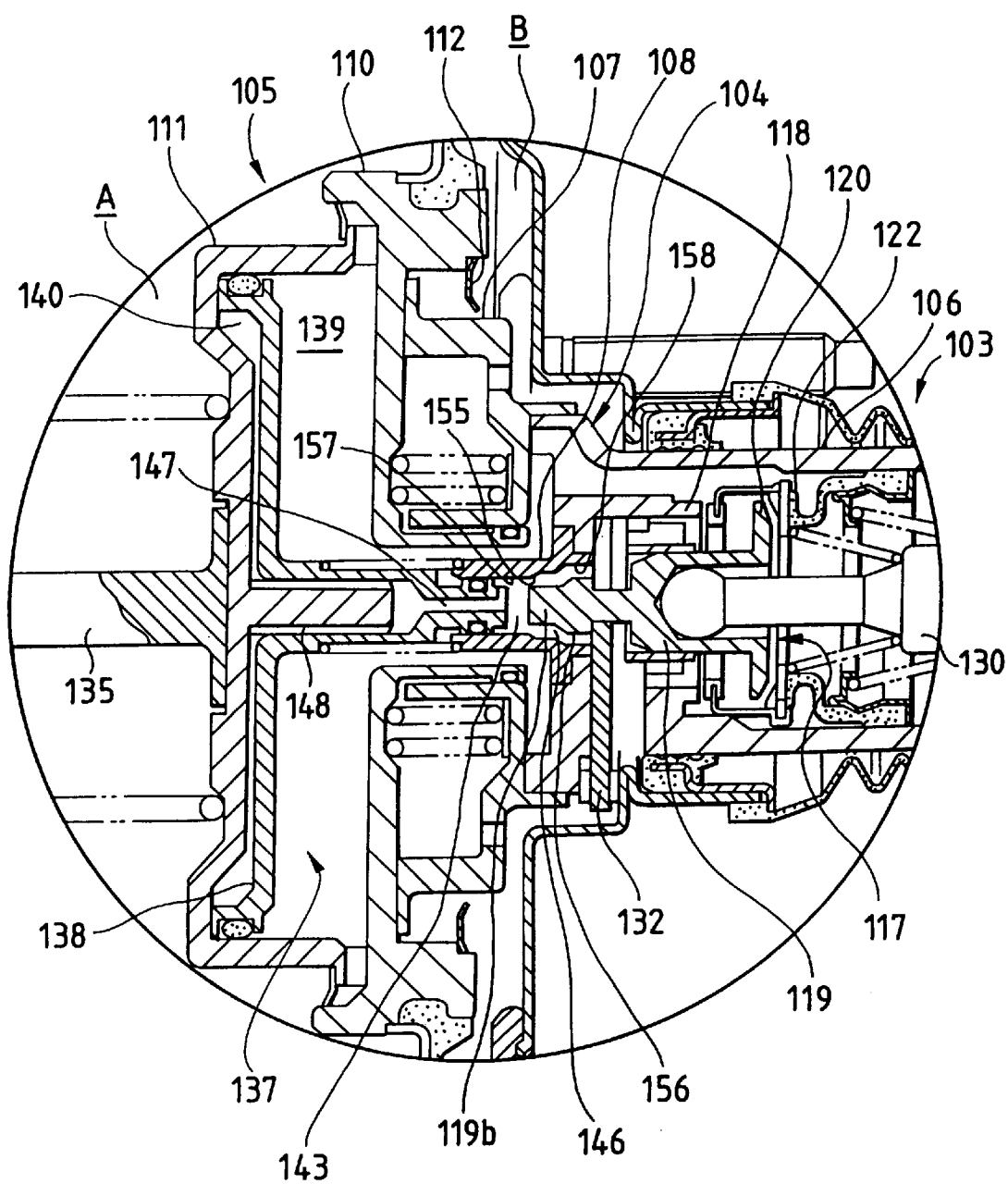
FIG. 4 is a cross sectional view showing a brake booster which is a second embodiment of the present invention.

Another brake booster according to a second embodiment of the present invention will be described with reference to FIGS. 4 and 5.

In rapid operation where the valve plunger 19 rushes to the advance end position to the valve body 3, the orifice passage 43 is perfectly closed by the sealing member 51. In this connection, the second embodiment is arranged such that a fluid passage area of an orifice passage 143 is reduced more than that in the normal operation by a throttle portion 155 within an inner member 108 of a valve body 103 and another throttle portion 156 in a rear part of the large-diameter portion 119b of a valve plunger 119. This arrangement can produce the useful effects comparable with those by the first embodiment.

To be more specific, the throttle portion 155 of the valve body 103 is provided at the middle position within the inner member 108 forming a first passage 146 of the orifice passage 143. A small-diameter portion 157 is provided on the front side of the throttle portion 155, and a large-diameter portion 158 is provided on the rear side thereof. Accordingly, the throttle portion 155 substantially corresponds to the throttle portion 156.

The throttle portion 156 for the valve plunger 119, while radially being extended, is provided around the rear side part of the large-diameter portion 119b of the valve plunger 119 which forms the first passage 146 of the orifice passage 143. The outside diameter of the throttle portion 156 is slightly smaller than that of the throttle portion 155 (the small-diameter portion 157).

In the non-operation state, viz., when the brake pedal is not depressed, or in a normal operation, the throttle portion 156 is positioned within a large-diameter portion 158 of the inner member 108. At this time, a passage area of the first passage 146 is larger than that of a second passage 147 formed in a counter force piston 138.

Figure 5:
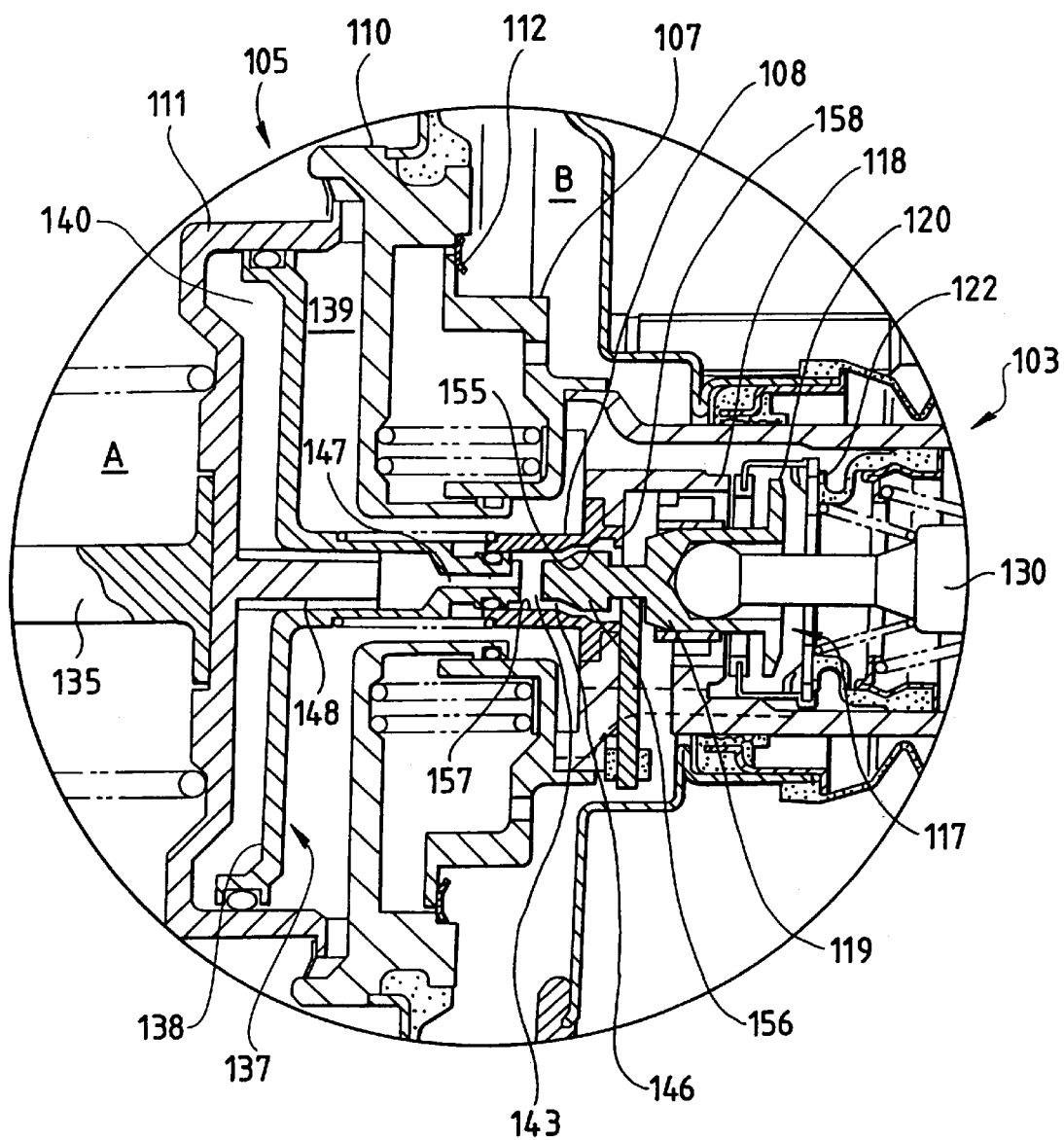
FIG. 5 is an enlarged, sectional view showing a key portion of the FIG. 1 booster when it is rapidly operated.

In such rapid depression that the valve plunger 119 is at the advance end position to the valve body 103, as shown in FIG. 5, the throttle portion 156 passes the large-diameter portion 158 and is positioned within the throttle portion 155. In this state, the fluid passage area of the first passage 146 is smaller than of the second passage 147.

The remaining construction of the second embodiment is substantially the same as that of the first embodiment. In the second embodiment, like or equivalent portions are designated by like numerals each appended with numeral "100", for simplicity.

As described above, likewise, in the second embodiment, in the normal operation where the brake pedal is depressed relatively gently and more quickly than the former, the fluid passage area of the first passage 146 partly constituting a part of the orifice passage 143 is larger than that of the second passage 147 substantially serving as the orifice passage 143. Therefore, as the pedaling speed of the brake pedal increases, the driver can operate the brake booster at lighter pedaling force.

In rapid operation where the valve plunger 119 rushes to the advance end position to the valve body 103, the throttle portion 156 for the valve plunger 119 moves into the throttle portion 155 of the valve body 103, so that the fluid passage area of the first passage 146 is smaller than that of the second passage 147.

In the rapid operation, the throttle portions 155 and 156 considerably reduces the amount of air introduced into a second variable-pressure chamber 140 when comparing with that in a normal operation for brake. Therefore, in the rapid operation, the differential pressure acting on the counter force piston 138 rises with a considerable retardation when comparing with this situation in the normal operation. This fact implies that the brake booster can be rapidly operated by a small pedaling force.

Incidentally, the throttle portions 155 and 156 in the second embodiment is unable to eliminate the dead zone following the full load condition of the brake booster.

<Third Embodiment>

Figure 6:
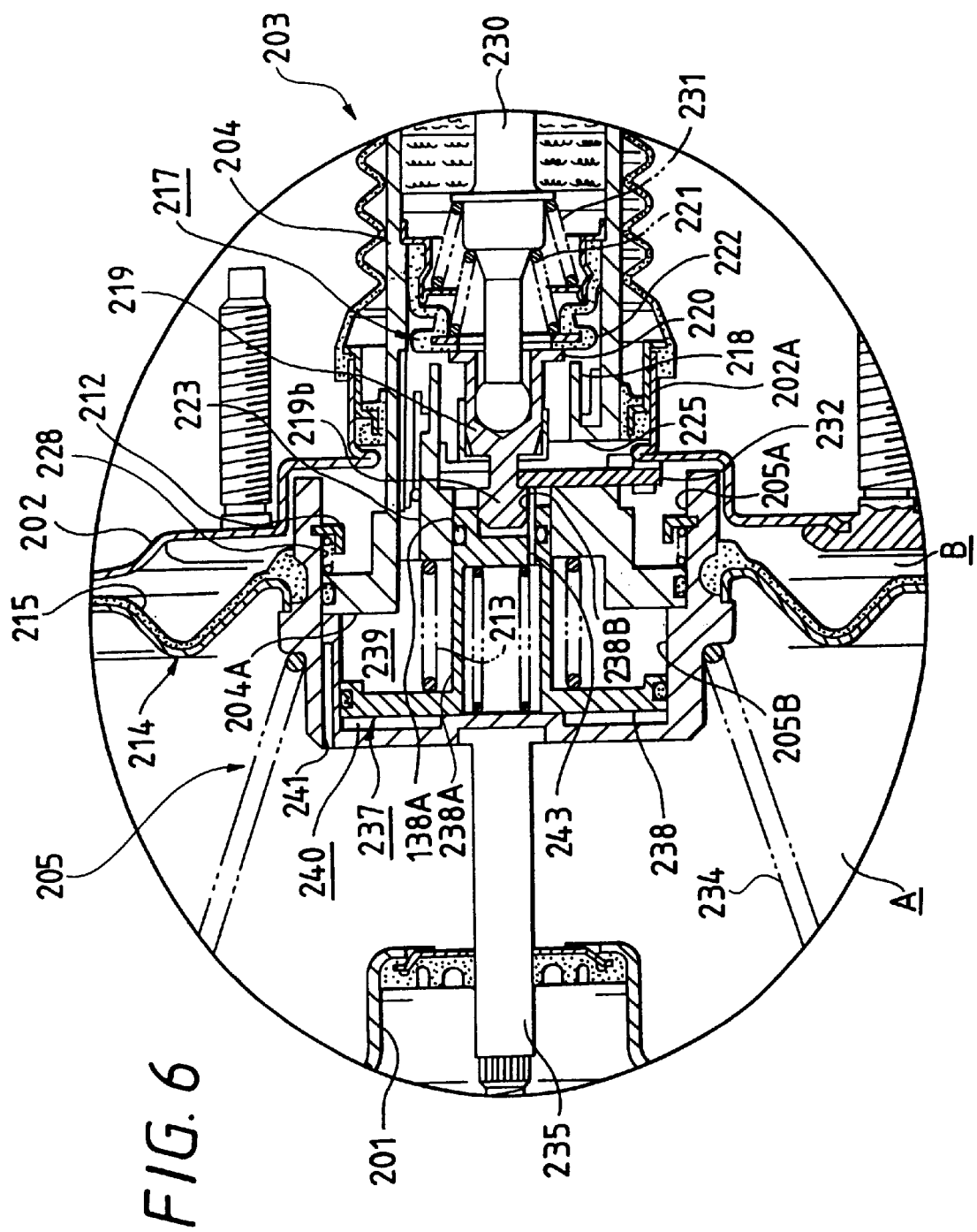
FIG. 6 is a cross sectional view showing a brake booster which is a third embodiment of the present invention.

A third embodiment of the present invention will be described with reference to FIG. 6.

As recalled, in the first (second) embodiment, the input-side member 4 (104) is formed with a plural number of members; the cylindrical member 6 (106), the outer member 7 (107), and the inner member 8 (108). The output-side member 5 (105) is also formed with a plural number of members; the rear side member 10 (110) and the front side member 11 (111). In the third embodiment to be described hereunder, an input-side member 204 and an output-side member 205 are each formed with a single member, which is formed by one-piece molding.

To be more specific, a valve body 203 includes the input-side member 204 and the output-side member 205. The input-side member 204, cylindrical in shape, is slidable inserted into a cylindrical portion 202A of a rear shell 202 in an air-tight manner. The output-side member 205 as a cylindrical member with the bottom is integral with a power piston 214 and an output shaft 235. The rear part of the output-side member 205 is opened. The input-side member 204 is slidable inserted into the output-side member 205 from its end opening.

The output-side member 205 includes a large-diameter portion 205A, a small-diameter portion 205B and a retainer 212. The large-diameter portion 205A is slightly larger in diameter than a front end portion 204A of the input-side member 204, and the small-diameter portion 205B is located on the front side of the front end portion 204A and smaller in diameter than the latter. The retainer 212 is located at a rear side of the front end portion 204A which is fitted into the large-diameter portion 205A. With this structure, the output-side member 205 is relatively movable between the small-diameter portion 205B and the retainer 212 with respect to the input-side member 204.

This embodiment is different from the first and second embodiments in that the spring 213 is resiliently installed not between the input-side member 204 and the output-side member 205 but the input-side member 204 and the counter-force piston 238.

With this structure, during the operation, since a part of a backward force of the counter force piston 238 is transmitted to the input-side member 204 through the spring 213, the input-side member 204 is relatively moved back with respect to the output-side member 205 until it is abutted against the retainer 212 immediately after the operation starts. In this way, when an interval between the input-side member 204 and the output-side member 205 is maximized immediately after the operation starts, an increase in brake output (braking force) becomes rapid with respect to the brake pedaling, thereby making it difficult to control a small braking output range.

Therefore, in this embodiment, in order to resist the back force which is transmitted from the counter-force piston 238, a spring 228 having a set load smaller than the spring 213 is resiliently disposed between the input-side member 204 and the retainer 212 so that the spring 228 determines the interval between the input-side member 4 and the output-side member 5 according to the amplitude of the backward force of the counter-force piston 238, that is, according to the amount of depressing the brake pedal.

During the non-operation shown in the figure, the input-side member 204 is engaged with a key member 232 which is abutted against the rear shell 202 by a resilient force of a return spring 234, and the self-diameter portion 205B of the output-side member 205 is engaged with the front-side end portion 204A of the input-side member 204, and in this state, the input-side member 204 is advanced relatively with respect to the output-side member 205.

As described above, because the input-side member 204 and the output-side member 205 are different in construction from the corresponding ones of the first and second embodiments, the orifice passage 243 setting up a communication between the second variable-pressure chamber 240 and the variable pressure chamber B is different in construction from the corresponding ones in the first and second embodiments.

In the first (second) embodiment, the large-diameter portion 19b (119b) of the valve plunger 19 (119) is inserted into the input-side member 4 (104). In the third embodiment, a large-diameter portion 219b of a valve plunger 219 is put in a recess 238B formed in the end of a protruded portion 238A of a counter force piston 238. With this, the orifice passage 243 is formed with only the portion corresponding to the second passage 47 (147) in the first (second) embodiment.

The remaining construction of the third embodiment is basically the same as that of the first (second) embodiment. In the third embodiment, like or equivalent portions are designated by like numerals each appended with number "200", for simplicity.

In the thus constructed third embodiment, the brake booster can be rapidly operated by a light pedaling force as in the first and second embodiments.

In the first to third embodiments, the input-side member 4, 104, 204 and the output-side members 5, 105, 205, which form the valve body 3, 103 203, are slidable. If required, the input-side member 4, 104, 204 and the output-side members 5, 105, 205 may be fixedly or immovably provided. In this case, it is impossible to reduce the stroke of the input shaft by use of the stroke reduction means 60. Therefore, there is no need of using the stroke reduction means 60.

In the first embodiment, the amount of depression of the brake pedal in the rapid operation for brake is reduced when comparing with that in the normal operation by the utilization of the stroke reduction means 60. The use of the stroke reduction means 60 is not essential, and may be omitted if necessary.

<Fourth Embodiment>

A fourth embodiment of the present invention will be described with reference to FIGS. 7 through 9. In the fourth embodiment, the invention is incorporated into a hydraulic pressure booster of the master cylinder type (referred to simply as a brake booster), while it is incorporated into the pneumatic pressure booster in the first to third embodiments.

Figure 7:
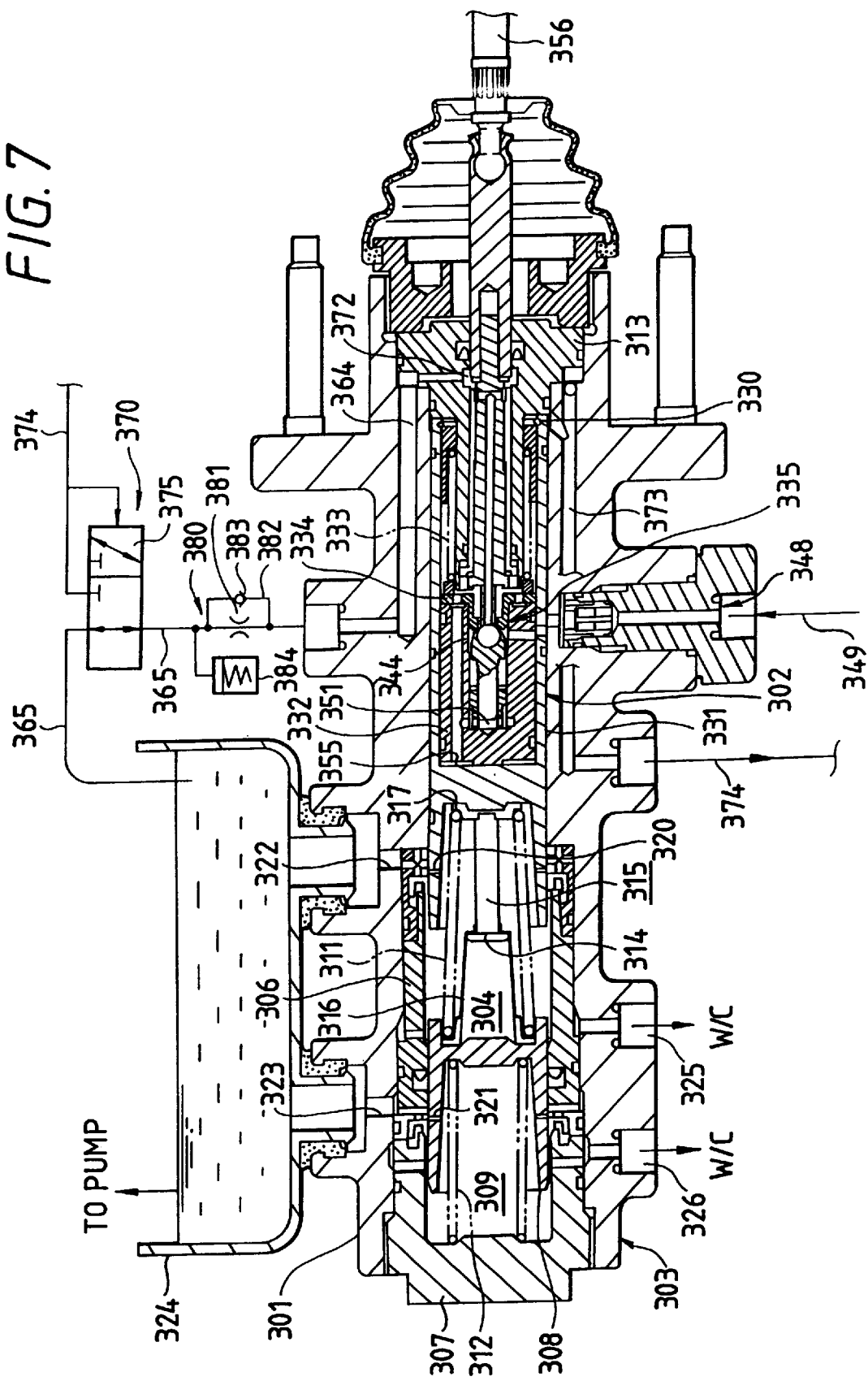
FIG. 7 is a cross sectional view showing a brake booster which is a fourth embodiment of the present invention.

As shown in FIG. 7, a power piston 302 which is cylindrical and has the bottom is slidable inserted into a small-diameter portion of a cylindrical housing 301. The left end of the power piston 302 is liquid tightly coupled into a first brake fluid chamber 304 of a master cylinder 303.

The master cylinder 303 includes a cylindrical inner member 306, a cylindrical outer member 307 with the bottom, and a piston 308. The inner member 306 is liquid-tightly fit into a large-diameter portion within the housing 301. The outer member 307 is inserted into the housing 301 through the end opening of the housing and press fit thereinto; firmly holds the inner member 306 with the aid of a stepped part of the housing 301; and seals the left end opening of the housing 301. The piston 308 is slidable and liquid tightly held within the inner member 306, while interlocking with the power piston 302. The first brake fluid chamber 304 is provided between the piston 308 and the power piston 302, and a second brake fluid chamber 309 is provided between the piston 308 and the outer member 307. Thus, in the fourth embodiment, the power piston 302 serves also as the piston for the first brake fluid chamber 304 of the master cylinder 303, whereby the output shaft is omitted.

Also in the fourth embodiment, a first spring 311 is resiliently put between the power piston 302 and the piston 308, and a second spring is put between the piston 308 and the outer member 307. When the hydraulic pressure booster or brake booster is in the non-operation state, the power piston 302 is brought into contact with a plug 313 to be given later, and the piston 308 is brought into contact with a retractable rod 314 disposed between it and the power piston 302.

The retractable rod 314 includes a rod portion 315 to be in contact with the power piston 302 and a slide portion 316, shaped like a bell, which is slidable fit to the rod portion 315 and to be in contact with the piston 308. The first spring 311 is placed in a compressed state between the slide portion 316 and a retainer 317 provided at the right end of the rod portion 315. In a non-operation state illustrated, the first spring 311 urges the slide portion 316 to be brought into contact with a stepped part formed at the left end of the rod portion 315. In this state, a set load of the first spring 311 is slightly larger than a set load of a second spring 312.

When the hydraulic pressure booster is in the non-operation state, the first brake fluid chamber 304 and the second brake fluid chamber 309 communicate with a reservoir 324, which is integrally coupled with the housing 301, by way of passages 320, 321 formed in the piston 308 and the power piston 302 and passages 322, 323 formed in the housing 301. Further, those communicates with wheel cylinders (not shown) by way of other passages 325 and 326 formed in the housing 301.

When the hydraulic pressure booster or the brake booster is in an operation state and the power piston 302 and the piston 308 are advanced, the reservoir 324 is disconnected from the first brake fluid chamber 304 and the second brake fluid chamber 309, but the communication of the first brake fluid chamber 304 and the second brake fluid chamber 309 with the wheel cylinders remains alive.

When the brake booster is operated and the power piston 302 advances, the piston 308 also advances. Therefore, the fluid pressures generated by the first brake fluid chamber 304 and the second brake fluid chamber 309 are supplied to the wheel cylinders associated therewith, respectively, whereby the braking operation is performed.

A construction of the hydraulic pressure booster will be described with reference to FIGS. 7 and 8.

The opening of the right end of the housing 301 is hermetically sealed with the plug 313. A power chamber 330 filled with pressurized oil is formed between the plug 313 and the power piston 302.

The power piston 302 includes an output side member 331 as a cylindrical member with the bottom, which faces the first brake fluid chamber 304 of the master cylinder 303, and an input side member 332 liquid tightly and slidable inserted into the output side member 331. A spring 333 that acts as urging means is resiliently put between the output side member 331 and the input side member 332. The insertion hole 33 urges the input side member 332 to the right with respect to the output side member 331. In a non-operation state illustrated, the input side member 332 is in engagement with the partitioning wall of the output side member 331.

A stepped sleeve 334 is liquid tightly held in the input side member 332. The left end of the stepped sleeve 334 serves as a first valve seat 336 partially forming a valve mechanism 335. A valve body 337, which also partially forms the valve mechanism 335, is located within the input side member 332. The valve body 337 is constructed with a shaft portion 339 and a ball 340 provided on the right side of the shaft portion 339. The shaft portion 339 is liquid tightly held by a collar 338 and slidable passes through the collar 338. A spring 341 is resiliently put between it and the collar 338. In the illustrated non-operation state, the spring 341 causes the valve body 337 to sit on the first valve seat 336.

A pressure chamber 344, provided between the valve body 337 and the first valve seat 336, is communicatively connected to a pump (not shown) by way of a supply passage 348 formed with passages 345, 346 and 347, and a conduit 349 (FIG. 7) connected to the former. The passage 345 is formed in the input side member 332; the passage 346 is formed in the output side member 331; and the passage 347 is formed in the housing 301. The pump constantly supplies an oil pressurized at a predetermined pressure to the pressure chamber 344. An accumulator (not shown) is provided downstream of the pump, and accumulatively stores a pressurized oil supplied from the pump.

A balance chamber 351, located between the valve body 337 and the input side member 332, communicates with the power chamber 330 via a communicating passage 352 formed in the input side member 332 and a through-hole 353 formed in the stepped sleeve 334. When the pressurized oil is led into the power chamber 330, the fluid connection allows the pressurized oil to flow into the balance chamber 351. The balance chamber 351 is provided for applying to the valve body 337 an urging force comparable with an urging force that it receives from the pressurized oil in the pressure chamber 344 in an opening state of the valve body 337. In the brake booster being operated, when a pedaling force is removed, the spring 341 causes the valve body 337 to sit on the first valve seat 336.

An urging chamber 355, which is formed between the power piston 302 and the input side member 332, (like the balance chamber 351) also communicates with the power chamber 330 via the communicating passage 352 formed in the input side member 332 and the through-hole 353 formed in the stepped sleeve 334. When the pressurized oil is supplied to the power chamber 330, the fluid connection allows the pressurized oil to flow into the urging chamber 355. The urging chamber 355 is provided for retracting the input side member 332 relative to the output side member 331 when the brake booster is operated. For this reason, the area of the key member 32 facing the urging chamber 355 is selected to be larger than its area facing the power chamber 330.

An input shaft 356, interlocked with a brake pedal (not shown), is liquid tightly and slidable inserted into the plug 313. A second valve seat 357 partially forming the valve mechanism 335. A spring 358 is resiliently put between the input shaft 356 and the stepped sleeve 334. The spring 358 urges the input shaft 356 to the right to detach the valve body 337 from the second valve seat 357 in the illustrated non-operation state in which the brake pedal is released.

A passage 360 communicating with the power chamber 330 is formed in the shaft portion of the input shaft 356. The power chamber 330 may communicate with the reservoir 324 via a discharging passage 364, which includes the passage 360, a passage 361 formed in the plug 313, and a passage 362 formed in the housing 301, and a conduit 365 (refer to FIG. 7) connected to the discharging passage 364.

As a result, when the hydraulic pressure booster is non-operative where the valve body 337 sits on the first valve seat 336 of the sleeve 334 and is detached from the second valve seat 357 of the input shaft 356, since the pressurized oil introduced into the pressure chamber 344 is recovered by the reservoir 324 through the power chamber 330 and the discharging passage 364. Therefore, there is no case where the pressurized oil is exerted on the output-side member 331 and the input-side member 332.

On the contrary, when the hydraulic pressure booster is operative where the brake pedal is depressed to move forward the input shaft 356, the second valve seat 357 formed in the extreme end of the input shaft 356 is brought into contact with the valve body 337; the discharging passage 364 is communicatively disconnected from the input shaft 30; the input shaft 356 detaches it from the first valve seat 336; the pressurized oil present in the pressure chamber 344 is introduced into the power chamber 330; and the pressurized oil introduced into the power chamber 330 moves forward the output side member 331 and the input side member 332 of the power piston 302. At this time, the pressurized oil of the power chamber 330 acts on the extreme end of the input shaft 356 protruded from the plug 313. This pressurized oil actin on the input shaft 356 is transmitted as a counter force to the driver.

In the brake booster being operated, when the brake pedal is released, the brake pedal and the input shaft 356 move backward; the valve body 337 sits on the first valve seat 336 of the stepped sleeve 334; the pressure chamber 344 is communicatively disconnected from the power chamber 330; and the second valve seat 357 of the input shaft 356 moves apart from the valve body 337; the pressurized oil is discharged from the power chamber 330 to the reservoir 324 via the discharging passage 364 and the conduit 365; and the structure of the brake booster resumes the illustrated non-operation state.

The hydraulic pressure booster of the fourth embodiment further includes another counter force generating means, which takes the form of a hydraulic-pressure counter-force mechanism 370 for transmitting a counter force to the input shaft 356, in addition to the already-described counter force generating means in which the pressurized oil in the power chamber 330 generates the counter force.

Figure 8:
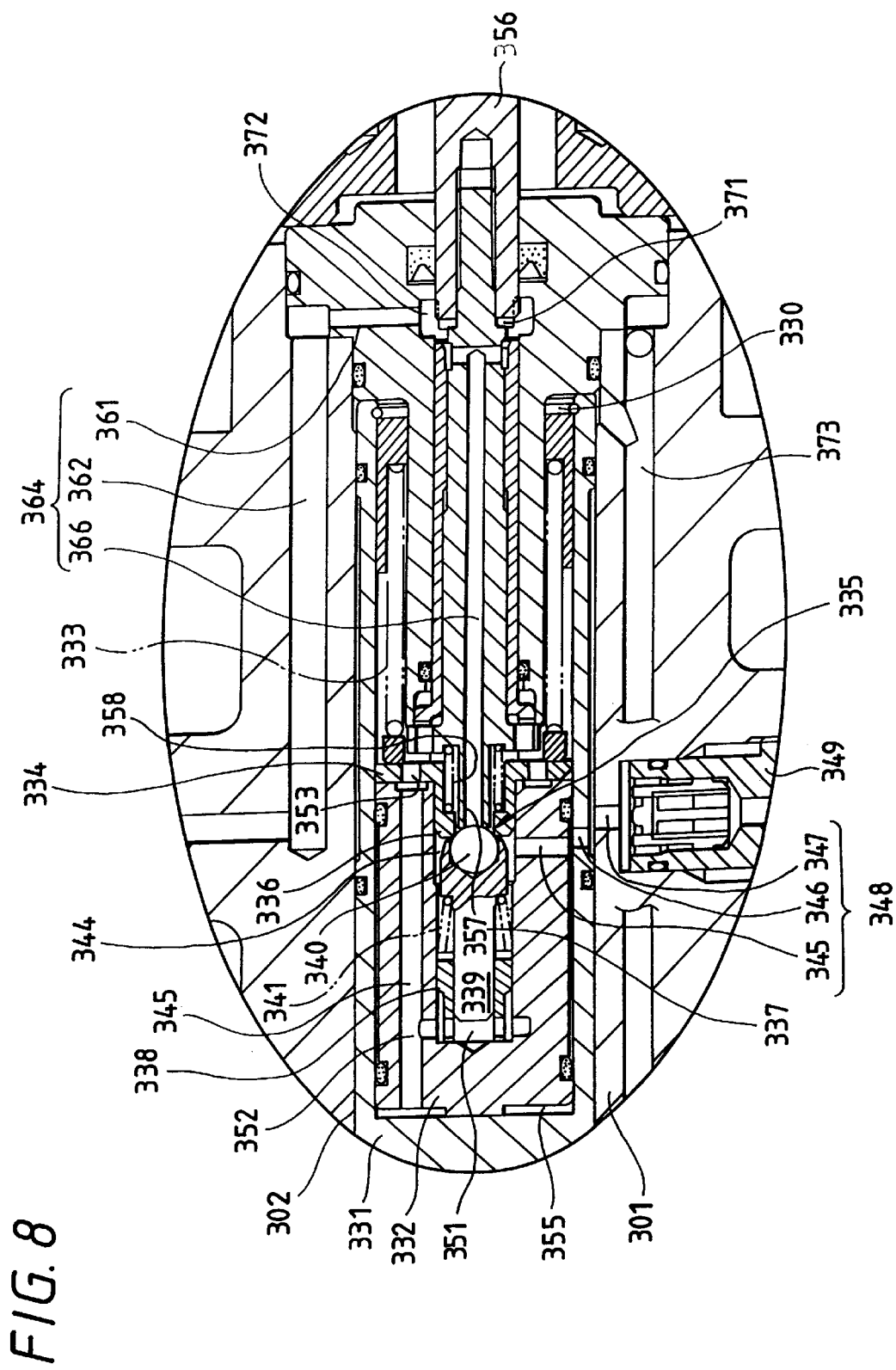
FIG. 8 is an enlarged, sectional view showing a key portion of the FIG. 7 booster.
Figure 9:
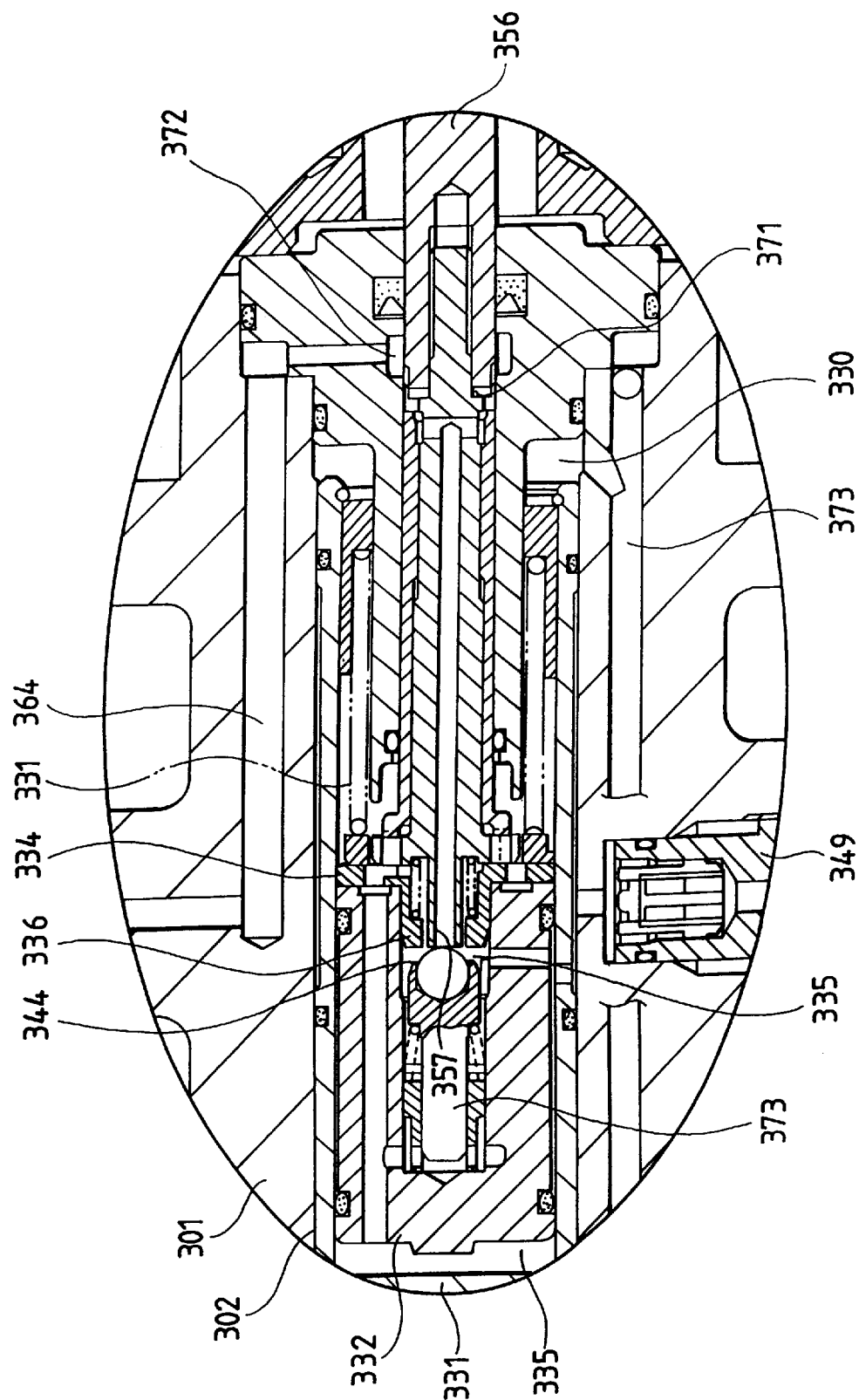
FIG. 9 is an enlarged, sectional view showing a key portion of the FIG. 7 booster for explaining an operation of the booster.

As shown in FIG. 8, the hydraulic-pressure counter-force mechanism 370 includes a stepped part 371 and a counter force chamber 372. The stepped part 371 is formed between the large-diameter portion as the rear portion of the input shaft 356 and the small-diameter portion as its front portion. The counter force chamber 372 is formed in the inner peripheral surface of the plug 313, while surrounding the stepped part 371. The counter force chamber 372 communicates with the passage 360 of the input shaft 356 and also with the passage 361 formed in the plug 313.

The hydraulic-pressure counter-force mechanism 370, as shown in FIG. 7, further includes a counter force passage 373, a conduit 374 and a passage switch valve 375. The counter force passage 373 is formed in the housing 301, and communicates with the power chamber 330. The conduit 374 communicatively connects the counter force passage 373 to the conduit 365. The passage switch valve 375, provided between the conduits 365 and 374, functions to switch the fluid passage to the conduit 365 or to the conduit 374.

The passage switch valve 375 communicatively connects the power chamber 330 with the reservoir 324 till a pressure of the pressurized oil of the power chamber 330 supplied through the counter force passage 373 and the conduit 374, exceeds a preset pressure, while at the same time communicatively disconnects the power chamber 330 from the counter force chamber 372. When the pressure of the pressurized oil of the power chamber 330 exceeds the preset pressure, the fluid passage is automatically switched under the pressure of the pressurized oil so that the power chamber 330 is disconnected from the reservoir 324, and the power chamber 330 is connected to the counter force chamber 372.

As seen from this, the pressurized oil supplied to the power chamber 330 is introduced into the counter force chamber 372 through the counter force passage 373, the passage switch value 375 and the discharging passage 364. As a result, the pressurized oil acts on the stepped part 371 of the input shaft 356 to urge the same to the right.

Consequently, the sum of the counter force acting on the input shaft 356 and the counter force from the counter force chamber 372 is transmitted, as a brake counter force to the driver.

A counter-force reducing means 380 for reducing the counter force derived from the hydraulic-pressure counter-force mechanism 370 is further adopted by the present embodiment.

The counter-force reducing means 380 is made up of an orifice 381, a conduit 382, a nonreturn valve 383 and a damper 384. The orifice 381 is coupled to the conduit 365 between the passage switch valve 375 and the discharging passage 364. The conduit 382 is disposed bypassing the orifice 381. The nonreturn value 383, coupled to the conduit 382, checks the flow of the pressurized oil from the power chamber 330 through the conduit 382 to the counter force chamber 372, while at the same time allows the pressurized oil to be discharged from the counter force chamber 372 or the power chamber 330 to the reservoir 324 via the conduit 382. The damper 384 is provided between the passage switch valve 375 and the orifice 381, and when the oil pressure within the conduit 365 rises above the preset value, it temporarily stores the pressurized oil in the conduit 365, to thereby protect the orifice 381 or the passage switch valve 375 against its breakage.

As seen from the above, the amount of pressurized oil introduced into the counter force chamber 372 via the orifice 381 is kept constant independently of a variation of the amount of pressurized oil introduced into the power chamber 330.

An operation of the hydraulic pressure booster thus constructed will be described.

1) The hydraulic pressure booster or brake booster is in the illustrated non-operation state, and in this state, the brake pedal is relatively gently depressed. The second valve seat 357 of the extreme end of the input shaft 356, as shown in FIG. 9, comes in contact with the valve body 337 to interrupt the communication of the discharging passage 364 with the power chamber 330; at the same time the valve body 337 moves apart the first valve seat 336 of the stepped sleeve 334 to set up a communication of the pressure chamber 344 with the power chamber 330; the pressurized oil is introduced from the pressure chamber 344 to the power chamber 330; and the output side member 331 and the input side member 332 of the power piston 302 are moved forward by the pressurized oil.

The amount of advancement of the input side member 332 is smaller than that of the output side member 331.

Specifically, the pressurized oil introduced into the urging chamber 355 urges the input side member 332 to the right. So long as the urging force is smaller than a set load of the spring 333, the input side member 332 advances together with the output side member 331. When the urging force exceeds the set load, the input side member 332 being in advancement moves apart the output side member 331 while resisting the spring force of the spring 333; the amount of advancement of the input side member 332 is smaller than that of the output side member 331.

As seen from this, the amount of advancement of the input side member 332, which contains the valve mechanism 335, is smaller than that of the output side member 331. Therefore, it is possible to reduce the advancement of the input shaft 356 caused by the advancement of the input side member 332, and the stroke of the brake pedal caused in linking with the shaft movement. In this respect, the brake feeling is improved when comparing with the conventional booster in which the valve mechanism 335 is directly mounted on the power piston 302.

Since the pressurized oil is introduced through the orifice 381 into the counter force chamber 372, the pressurized oil of the counter force chamber 372 and the above-mentioned pressurized oil of the power chamber 330 act on the input shaft 356, and both pressurized oil pressures are transmitted to the brake pedal. Accordingly, the driver feels his brake operation.

The timing and speed of the moving of the input-side member 332 apart from the output-side member 331 may be adjusted by use of a set load and a spring constant of the spring 333.

2) The operation of the brake booster when the depression speed of the brake pedal is rapidly depressed will be described. In this rapid operation, the valve body 337 is more greatly advanced to the input side member 332 than in the normal operation or when the brake pedal is normally depressed, by the second valve seat 357 of the input shaft 356.

Accordingly, the valve body 337 more greatly moves apart from the first valve seat 336 of the stepped sleeve 334 than in the normal operation. Because of this, a large amount of air is introduced into the power chamber 330 through a gap between the first valve seat 336 and the valve body 337, and hence the output side member 331 is rushed forward to effect a rapid braking.

On the other hand, only the same amount of pressurized oil as the oil amount in the normal operation is supplied to the counter force chamber 372 via the orifice 381. Therefore, the pressure of the pressurized oil in the counter force chamber 372 rises after the brake output increases.

As a result, the counter force that is applied from the hydraulic-pressure counter-force mechanism 370 to the brake pedal is small in the rapid operation, and the hydraulic pressure booster can be operated by a small force.

<Fifth Embodiment>

Figure 10:
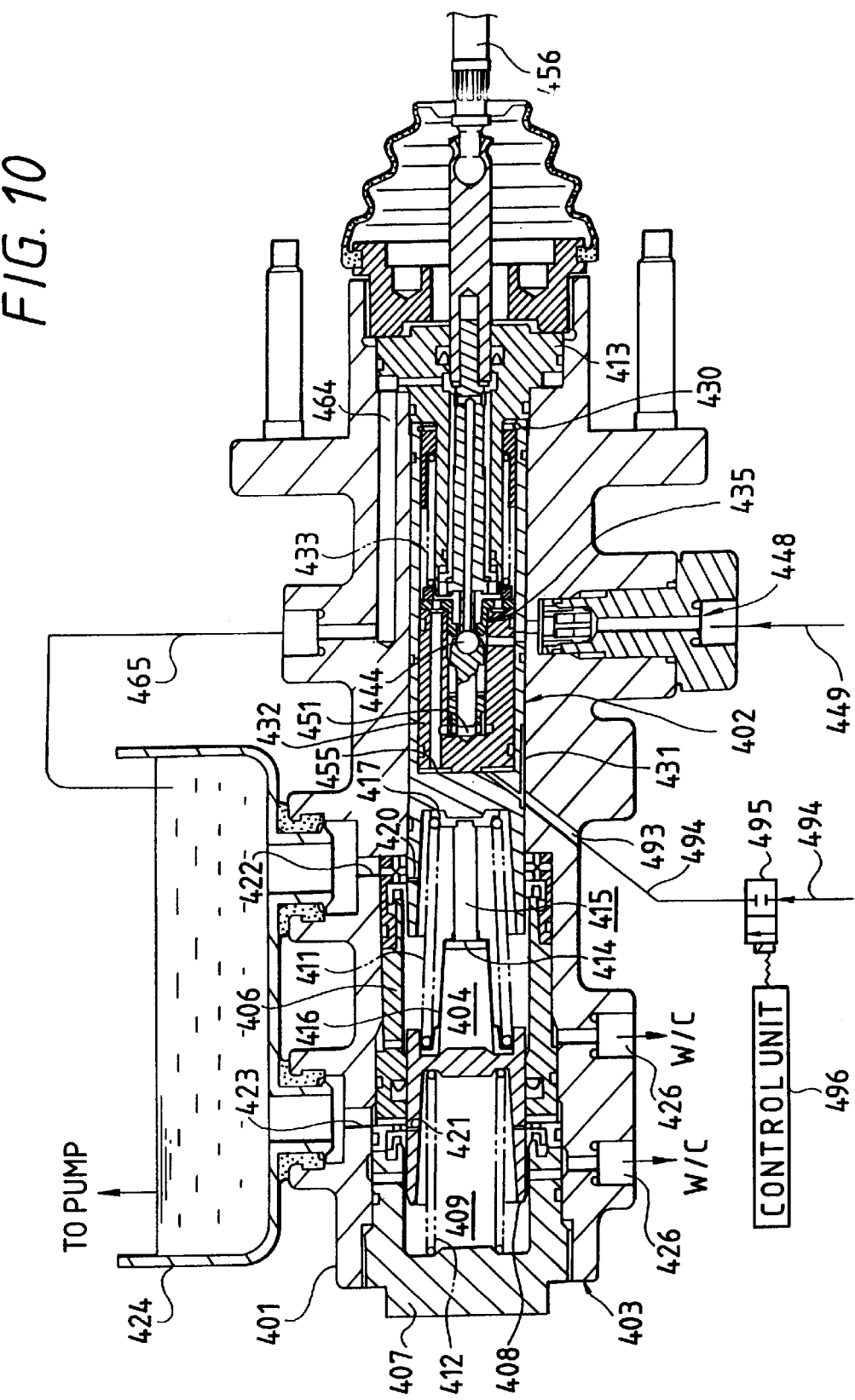
FIG. 10 is a cross sectional view showing a brake booster which is a fifth embodiment of the present invention.
Figure 11:
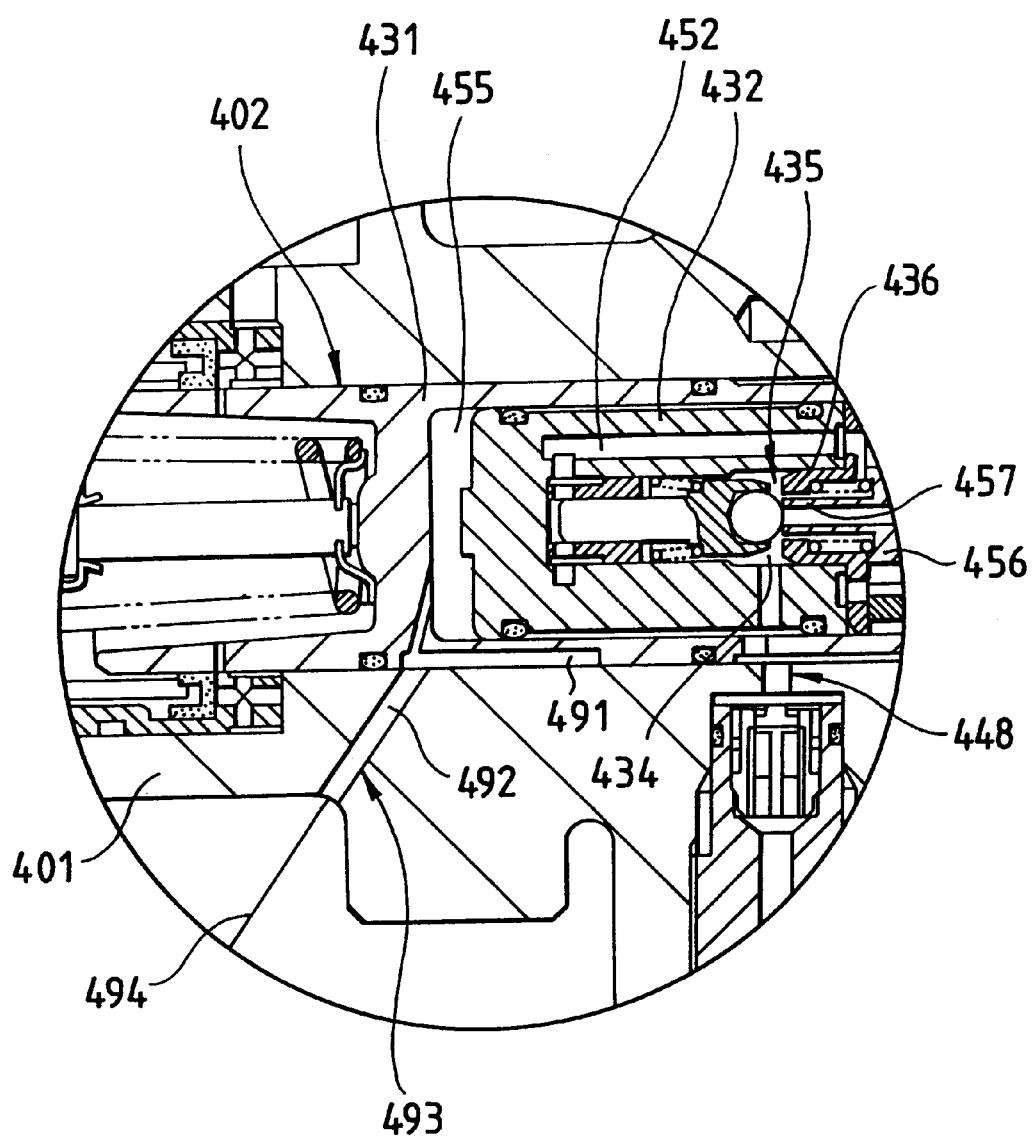
FIG. 11 is an enlarged, sectional view showing a key portion of the FIG. 10 booster for explaining an operation of the booster.

A fifth embodiment of the present invention will be described with reference to FIGS. 10 and 11. In this embodiment, the invention is incorporated into a hydraulic pressure booster. The hydraulic pressure booster (referred to as a brake booster) adopts a stroke reduction means 490 for reducing a stroke of the brake pedal in rapid operation for brake when comparing with the stroke in a normal operation for brake, while the fourth embodiment adopts the hydraulic-pressure counter-force mechanism 370 and the counter-force reducing means 380. If necessary, the stroke reduction means 490 may be used in combination with the hydraulic-pressure counter-force mechanism 370 and the counter-force reducing means 380. In this case, some design alteration is required for the stroke reduction means 490.

The stroke reduction means 490 is made up of an urging passage 493 including passages 491, 492, a conduit 494, a valve 495 and a control unit 496. The passage 491 is formed in an output side member 431 and communicates with an urging chamber 455 (FIG. 11). The passage 492 is formed in the housing 301 and communicates with the passage 491 (FIG. 11). The conduit 494 connects the urging passage 493 and a pump. The valve 495 is coupled to the conduit 494.

The control unit 496 functions: when the brake booster is in a non-operation state and in a normal operation state, the control unit closes the valve 495 to block the flow of the pressurized oil into the urging chamber 455; and when it is rapidly operated, the control unit releases or opens the valve 495 to allow the pressurized oil to flow into the urging chamber 455. The control unit 496 receives a signal from a sensor (not shown) for sensing a depression force acting on the brake pedal or a stroke speed; compares a value of the sensor signal with a predetermined value; and when the former is in excess of the latter, the control unit 496 judges that the brake pedal has been rapidly depressed, and releases the valve 495.

This embodiment is different from the fourth embodiment in that the flow of the pressurized oil between the urging chamber 455 and the communication passage 452 is blocked to prevent the pressurized oil from escaping from the interior of the urging chamber 455 through the communication passage 452.

The remaining construction of the fifth embodiment is substantially the same as that of the fourth embodiment. In the fifth embodiment, like or equivalent portions are designated by like numerals each appended with numeral "100", for simplicity.

An operation of the hydraulic pressure booster thus constructed will be described.

1) The hydraulic pressure booster or brake booster is in the illustrated non-operation state, and in this state, the brake pedal is relatively gently depressed. The second valve seat 457 of the extreme end of the input shaft 456 comes in contact with the valve body 437 to interrupt the communication of the discharging passage 464 with the power chamber 430; at the same time the valve body 437 moves apart the first valve seat 436 of the stepped sleeve 434 to set up a communication of the pressure chamber 444 with the power chamber 430; the pressurized oil is introduced from the pressure chamber 444 to the power chamber 430; and the output side member 431 and the input side member 432 of the power piston 402 are moved forward by the pressurized oil.

With this operation, the driver can pedal with the same operation feeling as that in the conventional general hydraulic pressure booster when he relatively gently depresses the brake pedal.

2) The operation of the brake booster when the depression speed of the brake pedal is rapidly depressed will be described. In this rapid operation, viz., when the control unit 496 judges that the brake pedal has been rapidly depressed, the valve body 437 is more greatly advanced to the input side member 432 than in the normal operation or when the brake pedal is normally depressed, by the second valve seat 457 of the input shaft 456.

Accordingly, the valve body 437 more greatly moves apart from the first valve seat 436 of the stepped sleeve 434. Because of this, a large amount of air is introduced into the power chamber 430 through a gap between the first valve seat 436 and the valve body 437, and hence the output side member 431 is rushed forward to effect rapid braking operation.

In synchronism with this, because of the judgement of the rapid braking by the control unit 496 of the stroke reduction means 490, the valve 495 having been closed is opened, whereby the pressurized oil is forcibly supplied to the urging chamber 455.

The pressurized oil is supplied to the urging chamber 355 from the pump as well as the power chamber 430. Therefore, the input side member 432 moves apart from the output side member 431 at a position located somewhat short of a normal position in the normal operation for brake.

Therefore, an amount of depression of the brake pedal that is performed by the driver is reduced by a distance between those positions, and an amount of pedal depression in the rapid operation may be reduced when comparing with that in the normal operation for brake. The result is improvement of a response performance of the brake booster and reduction of the braking distance in the rapid operation.

In the fourth embodiment, the output-side member 331 and the input-side member 332 containing the valve mechanism 335 are slidable. If required, the input-side member 332 may be fixed to the output-side member 331 so as to render those members immovable to each other.

In the fourth embodiment, the control unit 496 is set so that the amount of depressing the brake pedal is reduced only in the rapid braking operation. However, this embodiment is not limited by or to this, the control unit 496 may be set such that the pressurized oil of the amount that accords to the amount of depressing the brake pedal is fed.

<Sixth Embodiment>

Figure 12:
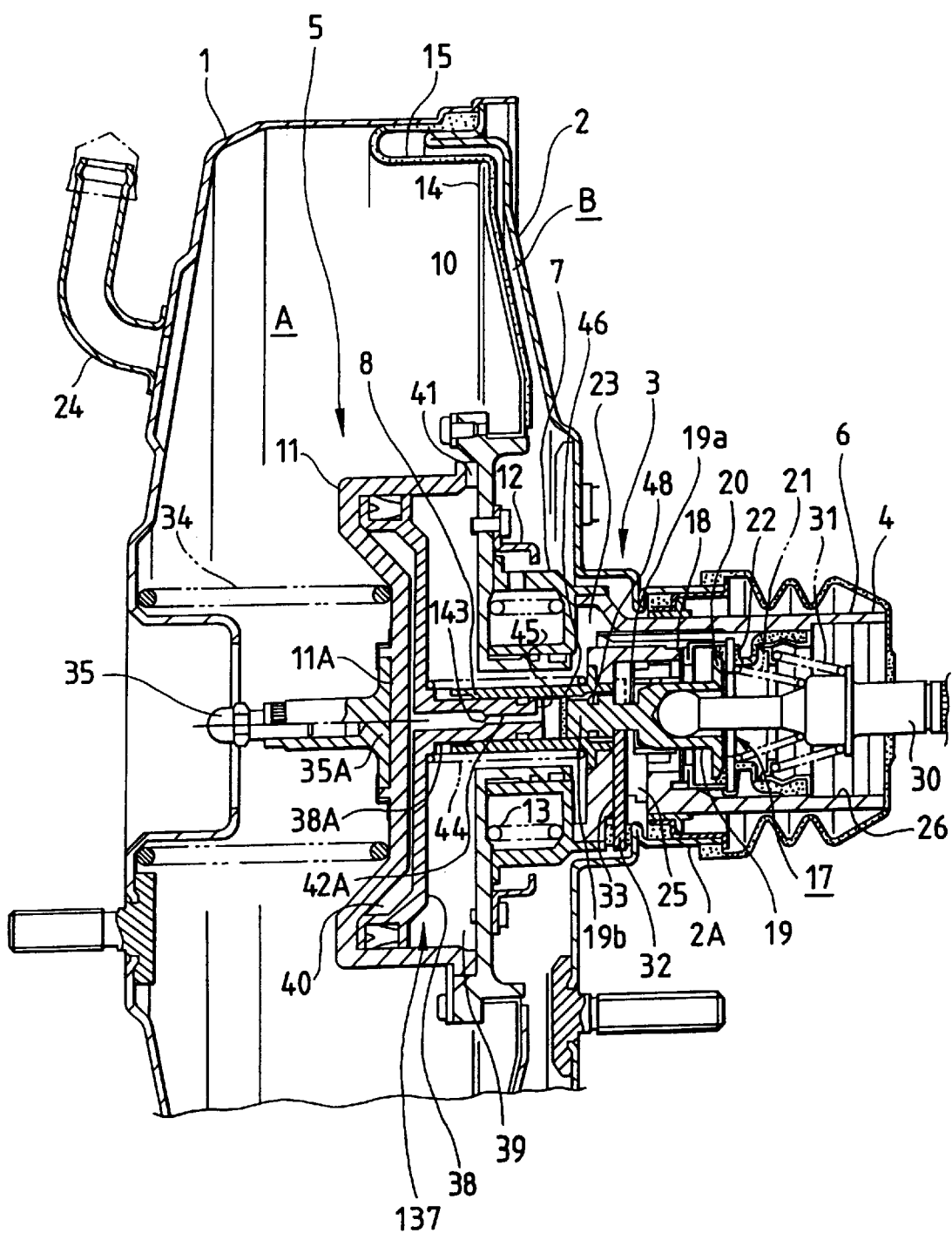
FIG. 12 is a cross sectional view showing a brake booster which is a sixth embodiment of the present invention.

A sixth embodiment of the present invention will be described with reference to FIGS. 12 through 14. In this embodiment, the invention is incorporated into a hydraulic pressure booster. In those figures, like or equivalent portions are designated by like reference numerals in the drawings referred to in the description of the first embodiment, for simplicity.

This embodiment uses pseudo counter-force applying means 137 which generates a pseudo counter force in accordance with an amount of depression or stroke of the brake pedal that is performed by the driver, and applies it to the driver.

To be more specific, the pseudo counter-force applying means 137 includes the counter force piston 38 slidable inserted into the front side member 11 of the output-side member 5. The counter force piston 38 separates the second constant-pressure chamber 39 located on the rear side within the front side member 11 from the second variable-pressure chamber 40 located on the front side within the same.

A ring-like sealing member 41 is disposed on the outer periphery of the counter-force piston 38 to allow the outer peripheral surface of the counter-force piston 38 to be air-tightly fitted into the inner peripheral surface of the front side member 11.

The second constant-pressure chamber 39 communicates with the constant pressure chamber A through a communicating hole 41 formed in the end of the front side member 11 which is located on the rear side, and further communicates with the constant-pressure passage 23.

The second variable-pressure chamber 40 communicates with a counter force passage 143 including a passage 42A formed in the shaft portion of the protruded portion 38A protruded to the rear from the shaft portion of the counter force piston 38, and a passage 42B, which is formed between the inner peripheral surface of the inner member 8 and the outer periphery, cut in part, of the large-diameter portion 19b of the valve plunger 19. With this, the second variable-pressure chamber 40 communicates with the variable pressure chamber B via the counter force passage 143 and the variable-pressure passage 25, and with the constant pressure chamber A via the counter force passage 143 and the constant-pressure passage 23.

A fluid passage area of the passage 42A of the counter force piston 38, which forms in part the counter force passage 143, is selected to be smaller than that of each of the passage 42B defined by the inner member 8 and the valve plunger 19 and the variable-pressure passage 25. This passage 42A substantially corresponds to an orifice passage.

The passage 42A, which is formed in the shaft portion of the protruded portion 38A of the counter force piston 38, is opened into a groove 45, which is formed in the rear-side end face of the protruded portion 38A while being radially extended. Therefore, when the protruded portion 38A comes in contact with the large-diameter portion 19b, the passage 42A communicates with the passage 42B through the groove 45.

In the non-operation state, the counter force piston 38 is separated from the valve plunger 19 by the spring force of the spring 44. Impact is produced at the instant that in this separated state, the counter force piston 38 retracts and is abutted against the valve plunger 19. This impact is considerably great. When receiving the impact, the driver will feel as if the brake pedal is instantaneously forced back.

To avoid this, a disc-like, thin buffering member 46 made of elastic material is provided on the front-side end face of the large-diameter portion 19b of the rear side member 10. To avoid the closing of the orifice passage 43, the buffering member 46 is cut in part at a location corresponding to the cut of the large-diameter portion 19b of the valve plunger 19.

The buffering member 46 made of elastic material may be replaced with a flat spring or a coiled spring.

In the present embodiment, a sealing member 48 for closing the counter force passage 143 is provided on the outer periphery of the large-diameter portion 19b of the valve plunger 19 in order that a large braking force is produced by a smaller padeling force in the rapid operation than in the normal operation.

In the non-operation state and the normal operation state, the sealing member 48 is positioned within the large-diameter portion 49 (FIG. 12), which is formed by cutting the inner peripheral surface of the inner member 8 of the input-side member 4, which defines the counter force passage 143. In this state, the variable-pressure passage 25 communicates with the second variable-pressure chamber 40 through a gap between the sealing member 48 and the large-diameter portion 49.

When the valve plunger 19 advances to the input-side member 4 by a predetermined distance or longer, the sealing member 48 moves out of the large-diameter portion 49, and is positioned at a small-diameter portion 50 formed on the front side of the large-diameter portion. In this state, the sealing member 48 comes in close contact with the small-diameter portion 50 to seal this portion.

Figure 13:
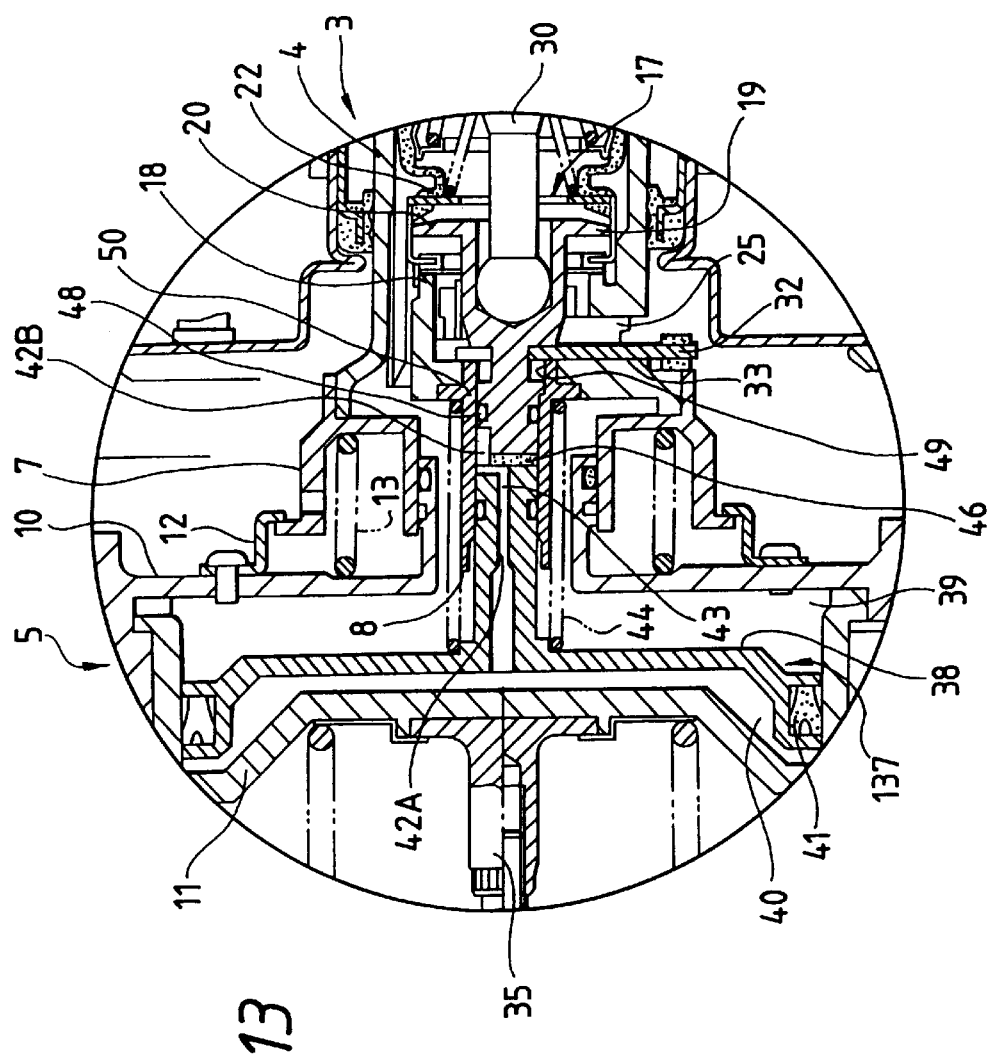
FIG. 13 is an enlarged, sectional view showing a key portion of the FIG. 12 booster when it is rapidly operated.

As seen from this, when the brake pedal is rapidly depressed, as shown in FIG. 13, the valve plunger 19 is greatly advanced to the input-side member 4, so that the sealing member 48 interrupts the communication of the variable-pressure passage 25 with the second variable-pressure chamber 40.

Figure 14:
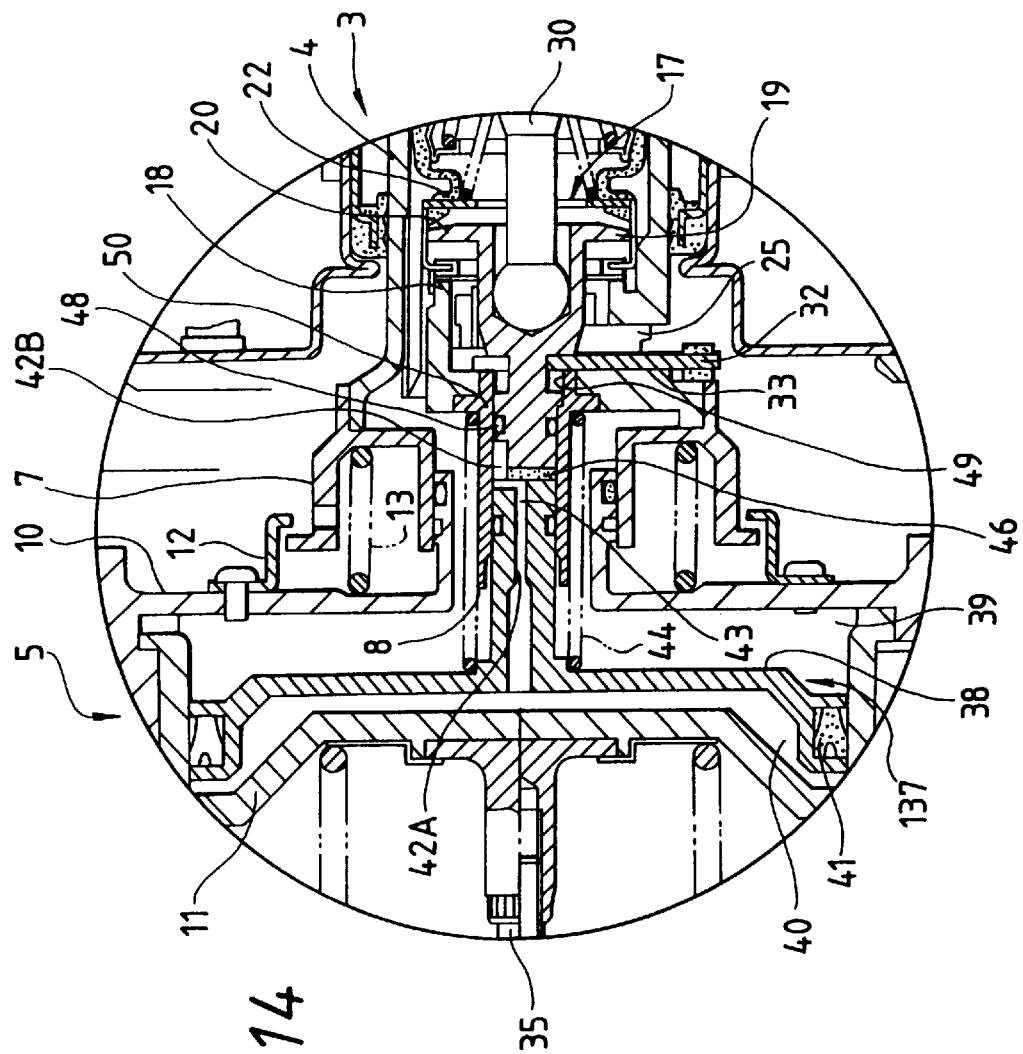
FIG. 14 is an enlarged, sectional view showing a key portion of the FIG. 13 booster when it is in the full load condition.

Also, when the brake pedal is gradually depressed and the brake booster is placed in the full load condition, as shown in FIG. 14, the valve plunger 19 greatly advances to the input-side member 4, so that the sealing member 48 interrupts the communication of the variable-pressure passage 25 with the second variable-pressure chamber 40.

In the present embodiment, a negative pressure is exerted on the portion of the input-side member 4 positioned within the variable pressure chamber B, while an atmospheric air is exerted on the portion thereof protruded out of the variable pressure chamber B. With this action, since a differential pressure larger than the set load of the springs 13A and 13B is applied to the input-side member 4 immediately after the valve mechanism 17 switches over from one state to the other state, the input-side member 4 is abutted against the output-side member 5 and advances together with the latter. Soon, since that differential pressure becomes low with a reduced negative pressure within the variable-pressure chamber B, the input-side member 4 is gradually isolated from the output-side member 5 when the differential pressure becomes lower than the set load of the springs 13A and 13B.

As described above, also in the embodiment, the amount of advancement of the input-side member 4 containing the valve mechanism 17 is smaller than that of the output-side member 5. Because of this, the advancement of the input shaft 30, which is performed with the advancement of the input-side member 4, and the stroke of the brake pedal interlocked with the input shaft 30, may be relatively reduced. Therefore, the brake feeling is enhanced when comparing with a case where the output-side member 5 and the input-side member 4 are fixed, and the amount of advancement of the output-side member 5 is equal to that of the input-side member 4.

Atmospheric air is introduced, through the orifice passage 43, into the second variable-pressure chamber 40 that is located on the front side of the counter force piston 38. Therefore, a differential pressure is created between the second variable-pressure chamber 40 and the second constant-pressure chamber 39, and urges the counter force piston 38 to move to the rear side.

In turn, the counter force piston 38 compresses the spring 44 and retracts; its protruded portion 38A comes in contact with the end face of the large-diameter portion 19b of the valve plunger 19; and the differential pressure acting on the counter force piston 38 is transmitted to the brake pedal through the valve plunger 19 and the input shaft 30. Therefore, the driver feels his brake operation.

Impact produced when the counter force piston 38 hits the large-diameter portion 19b of the valve plunger 19 is efficiently absorbed by the buffering member 46, to thereby lessen the impact transmitted to the valve plunger 19 and hence to prevent the impairing of an operation feeling.

The timing and speed of the moving of the input-side member 4 apart from the output-side member 5 may be adjusted by use of a set load and a spring constant of the spring 13.

The operation of the brake booster when the depression speed of the brake pedal is more quick than in the above-mentioned case where the brake pedal is gently depressed, is as in the first embodiment.

A retracting speed of the counter force piston 38 a little varies when the amount of opening by the second valve seat 20 and the valve body 22 is large. Therefore, when the brake pedal is relatively quickly operated, impact produced when the counter force piston 38 hits the valve plunger 19 is little increased, and hence the operation feeling is not impaired.

As a result, with the counter force that is transmitted to the brake pedal by the pseudo counter-force applying means 137, when the depressing speed of the brake pedal is high, the brake booster may be operated by a smaller force than the force required for operating the booster when the pedal is depressed gently.

The operation of the brake booster when the brake pedal is rapidly depressed is the same as that in the first embodiment.

In a normal operation, atmospheric air is introduced into the second variable-pressure chamber 40, which is located on the front side of the counter force piston 38, by way of counter force passage 143, viz., the space between the sealing member 48 and the large-diameter portion 49. In such rapid operation, the sealing member 48 passes the large-diameter portion 49, and comes in close contact with the small-diameter portion 50 to close the counter force passage 143 immediately after the valve mechanism 17 switches over from one state to the other state. Therefore, the counter-force piston 38 is urged toward the rear side due to a slight differential pressure so as to be sit on the valve plunger 19.

In such rapid operation that the valve plunger 19 rushes to the advance end position to the valve body 3, a small counter force is transmitted, with the result that the brake booster can be rapidly operated by a still less pedaling force in the rapid operation state than that in the normal operation state.

Also, when the brake pedal is gradually depressed and the brake booster is placed in the full load condition, the sealing member comes in close contact with the small-diameter portion 50 to close the counter force passage 143 (FIG. 14).

As described above, the embodiment is arranged such that the amount of advancement of the input-side member 4 is smaller than that of the output-side member 5. Therefore, in case where the brake booster is put in a full load condition and in this state the driver depresses the brake pedal to produce a further larger braking force, a dead zone where the brake output and the counter force are not increased even if the brake pedal is depressed will appear till the input-side member 4 abuts on the relatively advancing output-side member 5.

However, as described above, when the brake booster is placed in a full load condition, the sealing member 48 closes the counter-force passage 43 to hermetically seal the second variable-pressure chamber 40. As a result, since atmospheric air introduced into the second variable-pressure chamber 40 enables the input-side member 4 and the output-side member 5 to advance together, thereby preventing the brake feeling from being impaired.

In the sixth embodiment, the output-side member 5 and the input-side member 4 are slidable. If required, the invention may be applied to the normal brake booster in which the input-side member 4 and the output-side member 5 are fixedly arranged.

The embodiment uses the sealing member 48 to reduce the counter force in the rapid operation for brake. If required, the sealing member may be omitted.

As seen from the foregoing description, in the brake booster of the invention, the pseudo counter-force applying means 137 transmits a necessary counter force to the driver in the normal operation. In the rapid operation for brake, the counter-force reducing means reduces the counter force transmitted to the driver. Therefore, the brake booster can be rapidly operated by a less pedaling force in the rapid operation than in the normal operation.

Further, the counter force piston is brought into contact with the valve plunger with the counter-force reducing means being inserted therebetween. There is no chance of encountering such an unwanted situation that at the instant that the counter force piston hits the valve plunger, the driver feels as if the input shaft is instantaneously forced back. Therefore, the operation feeling is enhanced.

What is claimed is:

1. A brake system having a brake booster, and a wheel cylinder operated by a hydraulic pressure output from a master cylinder, said brake booster comprising:
   an input shaft;
   an output shaft;
   a valve body provided between said input shaft and said output shaft;
   a counter-force mechanism, for outputting and transmitting a counter force to said input shaft according to a control pressure provided when said brake booster is operated, mounted on said valve body; and
   counter-force reducing means for reducing the counter force transmitted from said counter-force mechanism when said brake booster is rapidly operated, said counter-force reducing means for changing a passage area of an adjustable passage for supplying said control pressure to said counter-force mechanism in accordance with the relative movement of said input shaft to said valve body.

2. A brake system according to claim 1, wherein said input shaft and said output shaft of said brake booster are relatively movable, and stroke reduction means is further provided for reducing a stroke of said input shaft relative to a stroke of said output shaft.

3. The brake system as claimed in claim 1, wherein
   said control pressure is a pressure in a variable pressure chamber,
   said adjustable passage is defined by a clearance between (1) a wall of an axial passage disposed in said valve body, and (2) a valve plunger provided on said input shaft and inserted into said axial passage,
   said axial passage has a large diameter portion and a small diameter portion, and
   said valve plunger is moveable between said large diameter portion and said small diameter portion to change said passage area of said adjustable passage.

4. A brake system comprising:
   a pneumatic pressure booster;
   a master cylinder; and
   a wheel cylinder operated by a hydraulic pressure output from said master cylinder;
   wherein said pneumatic pressure booster comprises:
   an input shaft interlocked with a brake pedal;
   an output shaft interlocked with said master cylinder;
   a shell;
   a valve body slidably disposed within said shell and provided between said input shaft and said output shaft;
   a power piston mounted on said valve body so that said power piston moves together with said output shaft;
   a fixed pressure chamber and a variable pressure chamber disposed on respective sides of said power piston;
   a valve mechanism for selectively connecting fluid passages located in said valve body, said valve mechanism including a valve plunger provided on said input shaft and slidably disposed within said valve body;
   a counter-force mechanism for preventing transmission of a counter force from said output shaft to said valve plunger when said pneumatic pressure booster is operated, and applying a pseudo counter force to said valve plunger in accordance with a control pressure provided; and
   counter-force reducing means for reducing the counter force transmitted from said counter-force mechanism to said valve plunger when said pneumatic pressure booster is rapidly operated, said counter-force reducing means for changing a passage area of an adjustable passage for supplying said control pressure to said counter-force mechanism in accordance with the relative movement of said input shaft to said valve body.

5. A brake system according to claim 4, wherein said counter-force mechanism includes a counter-force piston slidably disposed within said valve body, to transmit an urging force caused by a differential pressure between said constant-pressure chamber and said variable-pressure chamber which acts on said counter-force piston to said valve plunger as said pseudo counter force.

6. A brake system according to claim 5, wherein said adjustable passage limits a fluid flow which acts on said counter-force piston.

7. A brake system according to claim 5, further comprising:
   a sealing member disposed on an outer periphery of said counter-force piston.

8. A brake system according to claim 4, wherein said valve body comprises:
   an output-side member coupled with said power piston and said output shaft, said output-side member for receiving a differential pressure between said constant pressure chamber and said variable pressure chamber;
   an input-side member for receiving a differential pressure between said variable pressure chamber and atmospheric air, said input-side member being slidably disposed with respect to said output-side member and containing said valve mechanism; and
   a resilient member positioned between said output-side member and said input-side member, whereby a stroke of said input shaft is reduced relative to a stroke of said output shaft.

9. The brake system as claimed in claim 4, wherein
   said control pressure is a pressure in said variable pressure chamber,
   said adjustable passage is defined by a clearance between (1) a wall of an axial passage disposed in said valve body, and (2) said valve plunger inserted into said axial passage,
   said axial passage has a large diameter portion and a small diameter portion, and
   said valve plunger is moveable between said large diameter portion and said small diameter portion to change said passage area of said adjustable passage.

10. A brake system according to claim 1, wherein said input shaft and said output shaft of said brake booster are relatively movable, and stroke reduction means is further provided for reducing a stroke of said input shaft relative to a stroke of said output shaft when said brake booster is rapidly operated.

11. A brake system according to claim 6, wherein said adjustable passage is closed when said valve plunger advances a predetermined distance relative to said valve body.

12. A brake system according to claim 8, wherein said pneumatic pressure booster further includes stroke reduction means for reducing a stroke of said input shaft relative to a stroke of said output shaft when said brake booster is rapidly operated, said stroke reduction means includes an open/close valve for communicating/disconnecting said variable pressure chamber with/from atmospheric air, a conduit, a valve for opening and closing said conduit, a control unit for controlling the opening and closing operation of said valve, and a sensor for sensing rapid operation of said pneumatic pressure booster,
   wherein said control unit, when judging that said pneumatic pressure booster is rapidly operated, releases said valve to introduce atmospheric air into said variable pressure chamber.

* * * * *